United States Patent
Gunnarsson et al.

(10) Patent No.: US 11,821,992 B2
(45) Date of Patent: Nov. 21, 2023

(54) METHODS FOR HANDLING GNSS REFERENCE SYSTEM INFORMATION OF REFERENCE STATIONS

(71) Applicant: Telefonaktiebolaget LM Ericsson (publ), Stockholm (SE)

(72) Inventors: Fredrik Gunnarsson, Linköping (SE); Sara Modarres Razavi, Linköping (SE); Ritesh Shreevastav, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 380 days.

(21) Appl. No.: 17/049,399

(22) PCT Filed: May 17, 2019

(86) PCT No.: PCT/IB2019/054105
§ 371 (c)(1),
(2) Date: Oct. 21, 2020

(87) PCT Pub. No.: WO2019/220413
PCT Pub. Date: Nov. 21, 2019

(65) Prior Publication Data
US 2021/0080591 A1     Mar. 18, 2021

Related U.S. Application Data

(60) Provisional application No. 62/673,206, filed on May 18, 2018.

(51) Int. Cl.
*G01S 19/07* (2010.01)
*G01S 19/44* (2010.01)
(52) U.S. Cl.
CPC ............ *G01S 19/073* (2019.08); *G01S 19/44* (2013.01)

(58) Field of Classification Search
CPC .......... G01S 19/04; G01S 19/05; G01S 19/07; G01S 19/073; G01S 19/25; G01S 19/37;
(Continued)

(56) References Cited

U.S. PATENT DOCUMENTS 5,734,348 A     3/1998 Aoki et al.
2006/0273954 A1 * 12/2006 Diggelen ................. G01S 19/42
342/357.25

(Continued)

FOREIGN PATENT DOCUMENTS

WO   WO-2017130513 A1 *  8/2017 ............. G01S 19/04
WO   WO-2019103258 A1 *  5/2019 ............... G01S 1/68

OTHER PUBLICATIONS

Station. (1992). Academic Press Dictionary of Science and Technology (4th ed.). Elsevier Science & Technology. Credo Reference: https://search.credoreference.com/content/entry/apdst/station/0 (Year: 1992).*

(Continued)

*Primary Examiner* — Bernarr E Gregory
*Assistant Examiner* — Fred H Mull
(74) *Attorney, Agent, or Firm* — Murphy, Bilak & Homiller, PLLC

(57) ABSTRACT

Exemplary embodiments include methods of estimating the position of a user equipment, UE, in association with a plurality of reference stations. Such embodiments can include performing one or more positioning measurements (e.g., carrier-phase measurements of GNSS satellite signals), and receiving transfer information between a first reference system and a second reference system. Such embodiments can also include determining an estimate of the UE's position based on the positioning measurements for the UE, the transfer information, and location coordinates of a plurality of entities (e.g., reference stations), wherein the location (Continued)

coordinates of at least one entity is associated with the first reference system and the location coordinates of at least one other entity is associated with the second reference system. Other embodiments include complementary methods performed by network nodes, as well as UEs and network nodes configured to perform such methods.

21 Claims, 19 Drawing Sheets

(58) Field of Classification Search
CPC .......... G01S 19/41; G01S 19/43; G01S 19/44; G01S 5/009
See application file for complete search history.

(56) References Cited

U.S. PATENT DOCUMENTS

| | | | |
|---|---|---|---|
| 2009/0295630 A1 | 12/2009 | Wengler et al. | |
| 2014/0085139 A1* | 3/2014 | Leandro ................. | G01S 19/03 342/357.26 |
| 2016/0306050 A1* | 10/2016 | Shingyoji ............. | G01S 19/425 |
| 2017/0115400 A1* | 4/2017 | Nayyar .............. | H04B 1/70752 |
| 2020/0068348 A1* | 2/2020 | Li .......................... | G01S 19/04 |

OTHER PUBLICATIONS

In general. (2013). The American Heritage Dictionary of Idioms (2nd ed.). Houghton Mifflin. Credo Reference: https://search.credoreference.com/content/entry/hmidiom/in_general/0 (Year: 2013).*
ESA, Galileo and GPS 'synchronise watches': new time offset helps working together, https://www.esa.int/Applications/Navigation/Galileo_and_GPS_synchronise_watches_new_time_offset_helps_working_together, Mar. 2013 (Year: 2013).*
M. Szabova et al., Survey of GNSS Coordinates Systems, European Scientific Journal, vol. 12(24), p. 33-42, Aug. 2016 (Year: 2016.*
"3GPP TS 23.032 V14.1.0", 3rd Generation Partnership Project; Technical Specification Group Services and System Aspects; Universal Geographical Area Description (GAD) (Release 14), Mar. 2018, pp. 1-29.
"3GPP TS 29.171 V14.2.0", 3rd Generation Partnership Project; Technical Specification Group Core Network and Terminals; Location Services (LCS); LCS Application Protocol (LCS-AP) between the (MME) and (E-SMLC) (Release 14), Dec. 2017, pp. 1-55.
"3GPP TS 29.172 V14.2.0", 3rd Generation Partnership Project; Technical Specification Group Core Network and Terminals; Location Services (LCS); Evolved Packet Core (EPC) LCS Protocol (ELP) between the (GMLC) and (MME) (Release 14), Mar. 2018, pp. 1-43.
"3GPP TS 23.003 V15.3.0"; 3rd Generation Partnership Project; Technical Specification Group Core Network and Terminals; Numbering, addressing and identification (Release 15), Mar. 2018, pp. 1-6.
"3GPP TS 36.455 V14.4.0"; 3rd Generation Partnership Project; Technical Specification Group Radio Access Network; Evolved Universal Terrestrial Radio Access (E-UTRA); LTE Positioning Protocol A (LPPa); (Release 14), Dec. 2017, pp. 1-75.
"3GPP TS 36.331 V15.0.1"; Terrestrial Radio Access (E-UTRA); Radio Resource Control (RRC); Protocol specification (Release 15), 3GPP TS 36.331 V15.0.1, Jan. 2018, pp. 1-776.
"3GPP TS 36.305 V14.3.0"; 3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 14), Sep. 2017, pp. 1-78.
"3GPP TS 36.355 V14.5.1", 3rd Generation Partnership Project; Technical Specification Group Radio Access Network; Evolved Universal Terrestrial Radio Access (E-UTRA); LTE Positioning Protocol (LPP); (Release 14), Apr. 2018, pp. 1-171.
"Transfer of unicast reference station ambiguity level"; 3GPP TSG-RAN WG2#101bis; R2-1808748; Busan, Korea; Late resubmission of R2-1808110; May 21-25, 2018, pp. 1-11.

* cited by examiner

```
PROJCS["NAD27(76) / UTM zone 17N",
    GEOGCS["NAD27(76)",
        DATUM["North_American_Datum_1927_1976",
            SPHEROID["Clarke 1866",6378206.4,294.9786982138982,
                AUTHORITY["EPSG","7008"]],
            AUTHORITY["EPSG","6608"]],
        PRIMEM["Greenwich",0,
            AUTHORITY["EPSG","8901"]],
        UNIT["degree",0.01745329251994328,
            AUTHORITY["EPSG","9122"]],
        AUTHORITY["EPSG","4608"]],
    UNIT["metre",1,
        AUTHORITY["EPSG","9001"]],
    PROJECTION["Transverse_Mercator"],
    PARAMETER["latitude_of_origin",0],
    PARAMETER["central_meridian",-81],
    PARAMETER["scale_factor",0.9996],
    PARAMETER["false_easting",500000],
    PARAMETER["false_northing",0],
    AUTHORITY["EPSG","2029"],
    AXIS["Easting",EAST],
    AXIS["Northing",NORTH]]
```

*FIG. 5A*

```
GEOGCS["WGS 84",
    DATUM["WGS_1984",
        SPHEROID["WGS 84",6378137,298.257223563,
            AUTHORITY["EPSG","7030"]],
        AUTHORITY["EPSG","6326"]],
    PRIMEM["Greenwich",0,
        AUTHORITY["EPSG","8901"]],
    UNIT["degree",0.01745329251994328,
        AUTHORITY["EPSG","9122"]],
    AUTHORITY["EPSG","4326"]]
```

*FIG. 5B*

```
-- ASN1START
GNSS-RTK-ReferenceStationInfo-r15 ::= SEQUENCE {
    referenceStationID-r15              GNSS-ReferenceStationID-r15,
    referenceStationIndicator-r15       ENUMERATED {physical, non-physical},
    geoRefFrame-r15                     VisibleString (SIZE (1..32)) OPTIONAL,          -- Need OP
    antenna-reference-point-X-r15       INTEGER (-137438953472..137438953471),
    antenna-reference-point-Y-r15       INTEGER (-137438953472..137438953471),
    antenna-reference-point-Z-r15       INTEGER (-137438953472..137438953471),
    antennaHeight-r15                   INTEGER (0..65535)                              OPTIONAL,  -- Need ON
    antennaDescription-r15              AntennaDescription-r15                          OPTIONAL,  -- Need ON
    antenna-reference-point-unc-r15     AntennaReferencePointUnc-r15                    OPTIONAL,  -- Need ON
    physical-reference-station-info-r15 PhysicalReferenceStationInfo-r15                OPTIONAL,  -- Cond NP
    ...
}

AntennaDescription-r15 ::= SEQUENCE {
    antennaDescriptor-r15               VisibleString (SIZE (1..256)),
    antennaSetUpID-r15                  ENUMERATED { non-zero }                         OPTIONAL,  -- Need OP
    ...
}

AntennaReferencePointUnc-r15 ::= SEQUENCE {
    uncertainty-X-r15                   INTEGER (0..255),
    confidence-X-r15                    INTEGER (0..100),
    uncertainty-Y-r15                   INTEGER (0..255),
    confidence-Y-r15                    INTEGER (0..100),
    uncertainty-Z-r15                   INTEGER (0..255),
    confidence-Z-r15                    INTEGER (0..100),
    ...
}

PhysicalReferenceStationInfo-r15 ::= SEQUENCE {
    physicalReferenceStationID-r15      GNSS-ReferenceStationID-r15,
    physical-ARP-X-r15                  INTEGER (-137438953472..137438953471),
    physical-ARP-Y-r15                  INTEGER (-137438953472..137438953471),
    physical-ARP-Z-r15                  INTEGER (-137438953472..137438953471),
    physical-ARP-unc-r15                AntennaReferencePointUnc-r15                    OPTIONAL,  -- Need ON
    ...
}

-- ASN1STOP
```

*FIG. 15A*

*referenceStationID* : The Reference Station ID is determined by the RTK service provider.

*referenceStationIndicator* : Specifies type of reference station. Enumerated value *physical* indicates a real, physical reference station; *non-physical* indicates a non-physical or computed reference station.

*geoRefFrame* : Specifies the reference frame of the coordinates in this information element. If not present, coordinates are assumed to be defined in the WGS 84 datum.

*antenna-reference-point-X, antenna-reference-point-Y, antenna-reference-point-Z* : These fields specify the antenna reference point X-, Y-, and Z- coordinates in ECEF, in the World Geodetic System 1984 (WGS 84) datum, unless the field *geoRefFrame* is present, in which case these fields specify the antenna reference point coordinates in the in the reference frame defined by *geoRefFrame*. Scale factor 0.0001 m; range ±13,743,895.3471 m.

*antennaHeight* : This field specifies the height of the Antenna Reference Point above the marker used in the survey campaign. Scale factor 0.0001 m; range 0–6.5535 m.

*antennaDescriptor* : This field provides an ASCII descriptor of the reference station antenna using IGS naming convention. The descriptor can be used to look up model specific details of that ntenna.*antennaSetUpID* : This field, if present, indicates that the standard IGS Model is not valid (≠ 0 [30]). If this field is absent the standard IGS Model is valid ('0 = Use standard IGS Model' [30]).

*antenna-reference-point-unc* : This field specifies the uncertainty of the ARP coordinates. *uncertainty-X, uncertainty-Y,* and *uncertainty-Z* correspond to the encoded uncertainty of the X, Y, and Z-coordinate, respectively, for a High accuracy 3D point as defined in 3GPP TS 23.032 [15]. *confidence-X, confidence-Y,* and *confidence-Z* corresponds to confidence as defined in 3GPP TS 23.032 [15].

*physical-reference-station-info* : This field provides the coordinates (in the reference frame defined by the field *geoRefFrame* if present; otherwise in earth-centered, earth-fixed (ECEF) of the antenna reference point (ARP) for the real (or "physical") reference station used. This field may be used in case of the non-physical reference station approach to allow the target device to refer baseline vectors to a physical reference rather than to a non-physical reference without any connection to a physical point.

*physicalReferenceStationID* : This field specifies the station ID of a real reference station, when the *referenceStationIndicator* has the value '*non-physical*'.

*physical-ARP-X, physical-ARP-Y, physical-ARP-Z* : These fields specify the antenna reference point X-, Y-, and Z- coordinates in the World Geodetic System 1984 (WGS 84) datum, unless the field *geoRefFrame* is present, in which case these fields specify the antenna reference point coordinates in the in the reference frame defined by *geoRefFrame*. Scale factor 0.0001 m; range ±13,743,895.3471 m.

*physical-ARP-unc* : This field specifies the uncertainty of the ARP coordinates.

FIG. 15B

```
-- ASN1START
GNSS-RTK-AuxiliaryStationData-r15 ::= SEQUENCE {
    networkID-r15                        GNSS-NetworkID-r15,
    subNetworkID-r15                     GNSS-SubNetworkID-r15                    OPTIONAL, -- Need ON
    master-referenceStationID-r15        GNSS-ReferenceStationID-r15,
    auxiliaryStationList-r15             AuxiliaryStationList-r15,
    ...
}

AuxiliaryStationList-r15 ::= CHOICE {
    auxiliaryStationElement-r15          SEQUENCE (SIZE (1..32)) OF AuxiliaryStationElement-r15,
    auxiliaryStationElementGeoRefFrame-r15  SEQUENCE (SIZE (1..32)) OF AuxiliaryStationElementGeoRefFrame-r15,
}

AuxiliaryStationElement-r15 ::= SEQUENCE {
    aux-referenceStationID-r15           GNSS-ReferenceStationID-r15,
    aux-master-delta-latitude-r15        INTEGER (-524288..524287),
    aux-master-delta-longitude-r15       INTEGER (-1048576..1048575),
    aux-master-delta-height-r15          INTEGER (-4194304..4194303),
    aux-ARP-unc-r15                      Aux-ARP-Unc-r15                          OPTIONAL, -- Need ON
    ...
}

AuxiliaryStationElementGeoRefFrame-r15 ::= SEQUENCE {
    aux-referenceStationID-r15           GNSS-ReferenceStationID-r15,
    aux-master-delta-X-r15               INTEGER (-268435456..268435455),
    aux-master-delta-Y-r15               INTEGER (-268435456..268435455),
    aux-master-delta-Z-r15               INTEGER (-4194304..4194303),
    aux-ARP-unc-r15                      Aux-ARP-Unc-r15                          OPTIONAL, -- Need ON
    ...
}

Aux-ARP-Unc-r15 ::= SEQUENCE {
    horizontalUncertainty-r15            INTEGER (0..255),
    horizontalConfidence-r15             INTEGER (0..100),
    verticalUncertainty-r15              INTEGER (0..255)                         OPTIONAL,
    verticalConfidence-r15               INTEGER (0..100)                         OPTIONAL,
    ...
}

-- ASN1STOP
```

*FIG. 16A*

*networkID* : This field defines the network and the source of the particular set of reference stations and their observation information. The RTK service provider should ensure that the *networkID* is unique in the region serviced. The *networkID* indicates an area and its reference stations where the service providers will provide a homogenous solution with levelled integer ambiguities between its reference stations. In general, the area indicated by *networkID* will comprise one subnetwork with a unique *subNetworkID*.

*subNetworkID* : This field identifies the subnetwork of a network identified by *networkID*. In general the area indicated by *networkID* will consist of one subnetwork. The *subNetworkID* indicates the actual solution number of integer ambiguity level. If one network has only one subnetwork, this indicates that an ambiguity level throughout the whole network is established.

*master-referenceStationID* : This field identifies the Master Reference Station.

*aux-referenceStationID* : This field identifies the Auxiliary Reference Station.

*aux-master-delta-latitude* : This field provides the delta value in latitude of Antenna Reference Point of "Auxiliary Reference Station minus Master Reference Station" in geographical coordinates based on the reference frame defined in the field geoRefFrame, if present in IE *GNSS-RTK-ReferenceStationInfo; otherwise* based on GRS80 ellipsoid parameters for the same ECEF system as used in IE *GNSS-RTK-ReferenceStationInfo*. Scale factor $25 \times 10^{-6}$ degrees; range $\pm 13.1071$ degrees.

*aux-master-delta-longitude* : This field provides the delta value in longitude of Antenna Reference Point of "Auxiliary Reference Station minus Master Reference Station" in geographical coordinates based on GRS80 ellipsoid parameters for the same ECEF system as used in IE *GNSS-RTK-ReferenceStationInfo*. Scale factor $25 \times 10^{-6}$ degrees; range $\pm 26.2142$ degrees.

*aux-master-delta-height* : This field provides the delta value in ellipsoidal height of Antenna Reference Point of "Auxiliary Reference Station minus Master Reference Station" in geographical coordinates based on GRS80 ellipsoid parameters for the same ECEF system as used in IE *GNSS-RTK-ReferenceStationInfo*. Scale factor 1 milli-meter; range $\pm 4194.303$ m.

*aux-master-delta-X, aux-master-delta-Y* : These fields provide the delta values in the X-, Y-coordinates based on the reference frame defined by the field geoRefFrame in IE *GNSS-RTK-ReferenceStationInfo*, where the delta value is the (X, Y)-coordinates of Antenna Reference Point of Auxiliary Reference Station minus the (X, Y)-coordinates of the Antenna Reference Point of the Master Reference Station in IE *GNSS-RTK-ReferenceStationInfo*.. Scale factor 0.0001 m; range $\pm 26,843.5456$ m.

*aux-master-delta-Z* : This field provides the delta value in the Z-coordinate based on the reference frame defined by the field geoRefFrame in IE *GNSS-RTK-ReferenceStationInfo*, where the delta value is the Z-coordinate of Antenna Reference Point of Auxiliary Reference Station minus the Z-coordinate of the Antenna Reference Point of the Master Reference Station in IE *GNSS-RTK-ReferenceStationInfo*. Scale factor 1 milli-meter; range $\pm 4194.303$ m.

*aux-ARP-unc* : This field specifies the uncertainty of the auxiliary station ARP coordinates and comprise the following fields:

- *horizontalUncertainty* indicates the horizontal uncertainty of the ARP latitude/longitude. The '*horizontalUncertainty*' corresponds to the encoded uncertainty for a High accuracy 3D point as defined in 3GPP TS 23.032 [15] and '*horizontalConfidence*' corresponds to confidence as defined in 3GPP TS 23.032 [15].

- *verticalUncertainty* indicates the vertical uncertainty of the ARP altitude. The '*verticalUncertainty*' corresponds to the encoded uncertainty for a High accuracy 3D point as defined in 3GPP TS 23.032 [15] and '*verticalConfidence*' corresponds to confidence as defined in 3GPP TS 23.032.

*FIG. 16B*

```
-- ASN1START
GNSS-RTK-ReferenceStationInfo-r15 ::= SEQUENCE {
    referenceStationID-r15              GNSS-ReferenceStationID-r15,
    referenceStationIndicator-r15       ENUMERATED {physical, non-physical},
    geoRefFrame-r15                     VisibleString (SIZE (1..32))                OPTIONAL,   -- Need OP
    antenna-reference-point-ECEF-X-r15  INTEGER (-137438953472..137438953471),
    antenna-reference-point-ECEF-Y-r15  INTEGER (-137438953472..137438953471),
    antenna-reference-point-ECEF-Z-r15  INTEGER (-137438953472..137438953471),
    geoRefFrame-r15                     VisibleString (SIZE (1..32))                OPTIONAL,   -- Need OP
    antenna-reference-point-RefFrame-X-r15  INTEGER (-137438953472..137438953471)   OPTIONAL,   -- Cond RF
    antenna-reference-point-RefFrame-Y-r15  INTEGER (-137438953472..137438953471)   OPTIONAL,   -- Cond RF
    antenna-reference-point-RefFrame-Z-r15  INTEGER (-137438953472..137438953471)   OPTIONAL,   -- Cond RF
    antennaHeight-r15                   INTEGER (0..65535)                          OPTIONAL,   -- Need ON
    antennaDescription-r15              AntennaDescription-r15                      OPTIONAL,   -- Need ON
    antenna-reference-point-unc-r15     AntennaReferencePointUnc-r15                OPTIONAL,   -- Need ON
    physical-reference-station-info-r15 PhysicalReferenceStationInfo-r15            OPTIONAL,   -- Cond NP
    ...
}

AntennaDescription-r15 ::= SEQUENCE {
    antennaDescriptor-r15   VisibleString (SIZE (1..256)),
    antennaSetUpID-r15      ENUMERATED { non-zero }                                 OPTIONAL,   -- Need OP
    ...
}

AntennaReferencePointUnc-r15 ::= SEQUENCE {
    uncertainty-X-r15   INTEGER (0..255),
    confidence-X-r15    INTEGER (0..100),
    uncertainty-Y-r15   INTEGER (0..255),
    confidence-Y-r15    INTEGER (0..100),
    uncertainty-Z-r15   INTEGER (0..255),
    confidence-Z-r15    INTEGER (0..100),
    ...
}

PhysicalReferenceStationInfo-r15 ::= SEQUENCE {
    physicalReferenceStationID-r15      GNSS-ReferenceStationID-r15,
    physical-ARP-ECEF-X-r15             INTEGER (-137438953472..137438953471),
    physical-ARP-ECEF-Y-r15             INTEGER (-137438953472..137438953471),
    physical-ARP-ECEF-Z-r15             INTEGER (-137438953472..137438953471),
    physical-ARP-unc-r15                AntennaReferencePointUnc-r15                OPTIONAL,   -- Need ON
    physical-ARP-RefFrame-X-r15         INTEGER (-137438953472..137438953471)       OPTIONAL,   -- Cond RF
    physical-ARP-RefFrame-Y-r15         INTEGER (-137438953472..137438953471)       OPTIONAL,   -- Cond RF
    physical-ARP-RefFrame-Z-r15         INTEGER (-137438953472..137438953471)       OPTIONAL,   -- Cond RF
    ...
}
-- ASN1STOP
```

*FIG. 17A*

*RF* : The field is present if the field *geoRefFrame* is present; otherwise it is not present.

*geoRefFrame* : This fields specifies the reference frame of the additional coordinates in this information element

*antenna-reference-point-RefFrame-X* : This field specifies the antenna reference point X-coordinate in the reference frame defined by *geoRefFrame*. Scale factor 0.0001 m; range ±13,743,895.3471 m.

*antenna-reference-point-RefFrame-Y* : This field specifies the antenna reference point Y-coordinate in the reference frame defined by *geoRefFrame*. Scale factor 0.0001 m; range ±13,743,895.3471 m.

*antenna-reference-point-RefFrame-Z* : This field specifies the antenna reference point Z-coordinate in the reference frame defined by *geoRefFrame*. Scale factor 0.0001 m; range ±13,743,895.3471 m.

*physical-ARP-RefFrame-X* : This field specifies the antenna reference point X-coordinate in the reference frame defined by *geoRefFrame*. Scale factor 0.0001 m; range ±13,743,895.3471 m.

*physical-ARP-RefFrame-Y* : This field specifies the antenna reference point Y-coordinate in the reference frame defined by *geoRefFrame*. Scale factor 0.0001 m; range ±13,743,895.3471 m.

*physical-ARP-RefFrame-Z* : This field specifies the antenna reference point Z-coordinate in reference frame defined by *geoRefFrame*. Scale factor 0.0001 m; range ±13,743,895.3471 m.

*FIG. 17B*

```
-- ASN1START

GNSS-RTK-AuxiliaryStationData-r15 ::= SEQUENCE {
    networkID-r15                    GNSS-NetworkID-r15,
    subNetworkID-r15                 GNSS-SubNetworkID-r15           OPTIONAL,  -- Need ON
    master-referenceStationID-r15    GNSS-ReferenceStationID-r15,
    auxiliaryStationList-r15         AuxiliaryStationList-r15,
    ...
}

AuxiliaryStationList-r15 ::= SEQUENCE (SIZE (1..32)) OF AuxiliaryStationElement-r15

AuxiliaryStationElement-r15 ::= SEQUENCE {
    aux-referenceStationID-r15       GNSS-ReferenceStationID-r15,
    aux-master-delta-latitude-r15    INTEGER (-524288..524287),
    aux-master-delta-longitude-r15   INTEGER (-1048576..1048575),
    aux-master-delta-height-r15      INTEGER (-4194304..4194303),
    aux-ARP-unc-r15                  Aux-ARP-Unc-r15                 OPTIONAL,  -- Need ON
    aux-master-RefFrame-delta-X-r15  INTEGER (-268435456..268435455) OPTIONAL,  -- Cond RF
    aux-master-RefFrame-delta-Y-r15  INTEGER (-268435455..268435455) OPTIONAL,  -- Cond RF
    aux-master-RefFrame-delta-Z-r15  INTEGER (-4194304..4194303)     OPTIONAL,  -- Cond RF
    ...
}

Aux-ARP-Unc-r15 ::= SEQUENCE {
    horizontalUncertainty-r15        INTEGER (0..255),
    horizontalConfidence-r15         INTEGER (0..100),
    verticalUncertainty-r15          INTEGER (0..255)                OPTIONAL,  -- Need ON
    verticalConfidence-r15           INTEGER (0..100)                OPTIONAL,  -- Need ON
    ...
}

-- ASN1STOP
```

*FIG. 18A*

*RF* : The field is present if the field *geoRefFrame* is present; otherwise it is not present.

*aux-master-RefFrame-delta-X* *:* This field provides the delta value in the X-coordinate based on the reference frame defined by the field *geoRefFrame*. Scale factor 0.0001 m; range ±26,843.5456 m.

*aux-master-RefFrame-delta-Y* *:* This field provides the delta value in the Y-coordinate based on the reference frame defined by the field *geoRefFrame*. Scale factor 0.0001 m; range ±26,843.5456m.

*aux-master-RefFrame-delta-Z* *:* This field provides the delta value in the Z-coordinate based on the reference frame defined by the field. Scale factor 1 milli-meter; range ±4194.303 m.

*FIG. 18B*

METHODS FOR HANDLING GNSS REFERENCE SYSTEM INFORMATION OF REFERENCE STATIONS

TECHNICAL FIELD

The present disclosure relates generally to the field of wireless communications, and more specifically to techniques for determining the position of a wireless device (e.g., operating in a wireless network) in association with a plurality of reference stations that provide information to improve the accuracy of the position determination.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. This should also include spectrum compatibility. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. Similarly, one of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X2 interface, as shown in FIG. 1.

The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Procotol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after encryption by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 1 also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 2B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 2C shows a block diagram of an exemplary LTE radio interface protocol architecture from the perspective of the PHY. The interfaces between the various layers are provided by Service Access Points (SAPs), indicated by the ovals in FIG. 2C. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). The LTE FDD downlink (DL) radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier bandwidth of 15 kHz. The value of $N_{sc}$ is configurable based upon the available channel bandwidth. Since persons of ordinary skill in the art are familiar with the principles of OFDM, further details are omitted in this description.

A combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ subcarriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz sub-carrier bandwidth, a PRB pair comprises 168 REs.

The LTE FDD uplink (UL) radio frame is configured in a similar manner as the FDD DL radio frame. Using terminology consistent with the above DL description, each UL slot consists of $N^{UL}_{symb}$ OFDM symbols, each of which is comprised of $N_{sc}$ OFDM subcarriers.

Positioning has been an important feature in LTE. In the LTE positioning architecture, a positioning node (referred to as E-SMLC or location server) configures the target device (e.g. UE), an eNB, or a radio node dedicated for positioning measurements (e.g., location measurement unit, LMU) to perform one or more positioning measurements depending upon the positioning method. The positioning measurements are used by the target device, by a measuring node, or by the positioning node to determine the location of the target device.

FIG. 3 is a block diagram illustrating a high-level architecture for supporting UE positioning in LTE networks. In this figure, direct interfaces are indicated by solid lines and protocols between endpoints (e.g., via one or more direct interfaces) are indicated by dashed lines.

In this architecture, direct interactions between a UE and a location server (referred to as E-SMLC) occur via the LTE Positioning Protocol (LPP), as specified in 3GPP TS 36.355. Interactions between E-SMLC and eNB (e.g., eNB serving the UE) occur via the LPPa protocol (as specified in 3GPP TS 36.455). To some extent, this is supported by interactions between eNB and UE over the Uu interface via the Radio Resource Control (RRC) protocol specified in 3GPP TS 36.331. The LCS-AP protocol (specified in 3GPP TS 29.171) supports interactions between E-SMLC and MME over the SLs interface, and the ELP protocol (as specified in 3GPP TS 29.172) supports interactions between MME and the Gateway Mobile Location Center (GMLC) over the SLg interface.

3GPP TS 36.305 specifies support for the following LTE positioning techniques:

Enhanced Cell ID. Utilizes information to associate the UE with the geographical area of a serving cell, and then additional information to determine a finer granularity position.

Assisted GNSS. The UE receives and measures Global Navigation Satellite System (GNSS) signals, supported by assistance information provided to the UE from E-SMLC. Two subcategories are UE-based (in which the UE calculates its own position) and UE-assisted (in which E-SMLC calculates the UE's position).

OTDOA (Observed Time Difference of Arrival). The UE estimates the time difference of reference signals transmitted by different base stations (also refereed to as "reference signal time difference" or "RSTD") and sends to the E-SMLC for multilateration.

UTDOA (Uplink TDOA). The UE is requested to transmit a specific waveform that is detected by multiple location measurement units (e.g. an eNB) at known positions. These measurements are forwarded to E-SMLC for multilateration.

In the LTE Release 15 positioning work item (WI), one objective is to provide support for Real Time Kinematics (RTK) GNSS positioning. It has been also agreed that both UE-based and UE-assisted GNSS RTK positioning would be supported. In relation to UE-based GNSS RTK positioning—in which a UE obtains assistance data from a location server/network node (e.g., E-SMLC) to support position calculation in the UE—the assistance data can be generated based on observations from one or more reference stations. In general, a "reference station" can refer to a node with known position and known antenna configuration, and also having a GNSS receiver capable of measuring signals from one or more satellite systems. Each GNSS (e.g., GPS) can comprises one or more satellites, with each satellite transmitting one or more signals in one or more frequency bands.

A reference station network can gather a plurality of reference station observations of various GNSS satellite signals and can interpolate to generate calculated observations at locations other than actual ("physical") reference station positions. These locations can be referred to as "non-physical" or "virtual" reference stations. FIG. 4 illustrates an exemplary reference station network usable for UE positioning. In this manner, the served UEs obtains observations from one or more physical and/or virtual reference stations, which it can use for positioning itself together with its own GNSS satellite measurements. Gathering reference-station observations, calculating non-physical reference-station observations, and providing this information to UEs can be performed by a server, such as a network RTK (NRTK) server. Such functionality can also be part of a positioning node or positioning server in a 3GPP network, such as E-SMLC in LTE or a location management function (LMF) in a 5G/NR network.

The position information of physical or non-physical reference stations are typically represented in the WGS 84 as an earth-referenced, earth-fixed (EREF) coordinate (X, Y, Z). However, these representations are known to be somewhat inaccurate locally, and there can be significant mismatches compared to regional maps, causing significant issues when combining the estimated position with such maps.

SUMMARY

Exemplary embodiments disclosed herein address these problems, issues, and/or drawbacks of existing solutions by providing a flexible but efficient approach for facilitating a separate association of the coordinates to a reference system that can be regional and/or local. As such, exemplary embodiments of the present disclosure can enable and/or facilitate estimated positions to be aligned with map data associated with a local and/or regional coordinate system.

Exemplary embodiments of the present disclosure include methods (e.g., procedures) for estimating the position of a user equipment (UE) in association with a plurality of reference stations. The exemplary methods can be performed by a UE or wireless device.

The exemplary methods can include performing one or more positioning measurements for the UE. In some embodiments, the one or more positioning measurements can include carrier-phase measurements of signals transmitted by a plurality of global navigation satellite system (GNSS) satellites. In some embodiments, the plurality of GNSS satellites can include a plurality of GPS satellites, and the carrier-phase measurements can be of L1 signals transmitted by the GPS satellites.

In some embodiments, the exemplary methods can also include obtaining coordinates of a reference station together with an indication of the reference system associated with the reference station (e.g., the reference system of the coordinates). In various embodiments, this can include coordinates of a first reference station together with an indication of a first reference system, and/or coordinates of a second reference station together with an indication of a second reference system. The indication of the relationship can be explicit or implicit.

In some embodiments, the exemplary method can also include sending, to the network node, identifiers of the first reference station, a second reference station, and the first reference system. In some embodiments, this information can be sent as part of a reference system (RS) transfer request. The exemplary method can also include receiving transfer information between the first reference system and a second reference system. In some embodiments, this transfer information can be received in response to sending the identifiers.

The exemplary method can also include determining an estimate of the UE's position based on the positioning measurements, the transfer information, and location coordinates of a plurality of entities. The location coordinates of at least one entity can be associated with the first reference system and location coordinates of at least one other entity can be associated with the second reference system. For example, the at least one entity associated with the first reference system can be a first reference station, and the at least one other entity associated with the second reference system can be a second reference station. In some embodiments, the exemplary method can also include sending, to a wireless network, the estimate of the UE's position associated with either the first reference system or the second reference system.

Other exemplary embodiments include methods for assisting the positioning of a user equipment (UE) in association with a plurality of reference stations. These exemplary methods can be implemented in a network node (e.g., positioning server, base station, eNB, E-SMLC, gNB, LMF, etc. or component thereof).

In some embodiments, the exemplary methods can include sending, to the UE, coordinates of a reference station together with an indication of the reference system associated with the reference station (e.g., the reference system of the coordinates). In various embodiments, this can include coordinates of a first reference station together with an indication of a first reference system, and/or coordinates of a second reference station together with an indication of a second reference system. The indication of the relationship can be explicit or implicit.

In some embodiments, the exemplary method can also include receiving, from the UE, identifiers of the first reference station, a second reference station, and the first reference system. In some embodiments, this information can be received as part of a reference system (RS) transfer request. The exemplary method can also include sending, to the UE, transfer information between the first reference system and a second reference system. In some embodiments, this transfer information can be sent in response to receiving the identifiers.

In some embodiments, the exemplary methods can also include receiving, from the UE, an estimate of the UE's position associated with the first reference system or the second reference system. Even if the UE's position estimate is based on carrier-phase measurements from first and second reference stations that are associated with different first and second reference systems, the position estimate can be associated with either reference system due to the previously-provided transfer information.

Other exemplary embodiments include user equipment (UEs, e.g., wireless devices) or network nodes (e.g., positioning servers, base stations, eNBs, E-SMLCs, gNBs, LMFs, etc. or components thereof) configured to perform operations corresponding to any of the exemplary methods described herein. Other exemplary embodiments include non-transitory, computer-readable media storing program instructions that, when executed by at least one processor, configure such UEs or network nodes to perform operations corresponding to any of the exemplary methods described herein.

These and other objects, features and advantages of the exemplary embodiments of the present disclosure will become apparent upon reading the following Detailed Description in view of the Drawings briefly described below.

BRIEF DESCRIPTION OF THE DRAWINGS

FIGS. 5A-B show exemplary Well Known Text (WKT) string definitions of two exemplary coordinate systems.

FIGS. 15-18 illustrate exemplary ASN.1 code specifications of various exemplary GNSS Assistance Data signaling between a UE and a network node, according to various exemplary embodiments of the present disclosure.

DETAILED DESCRIPTION

Figure 1:
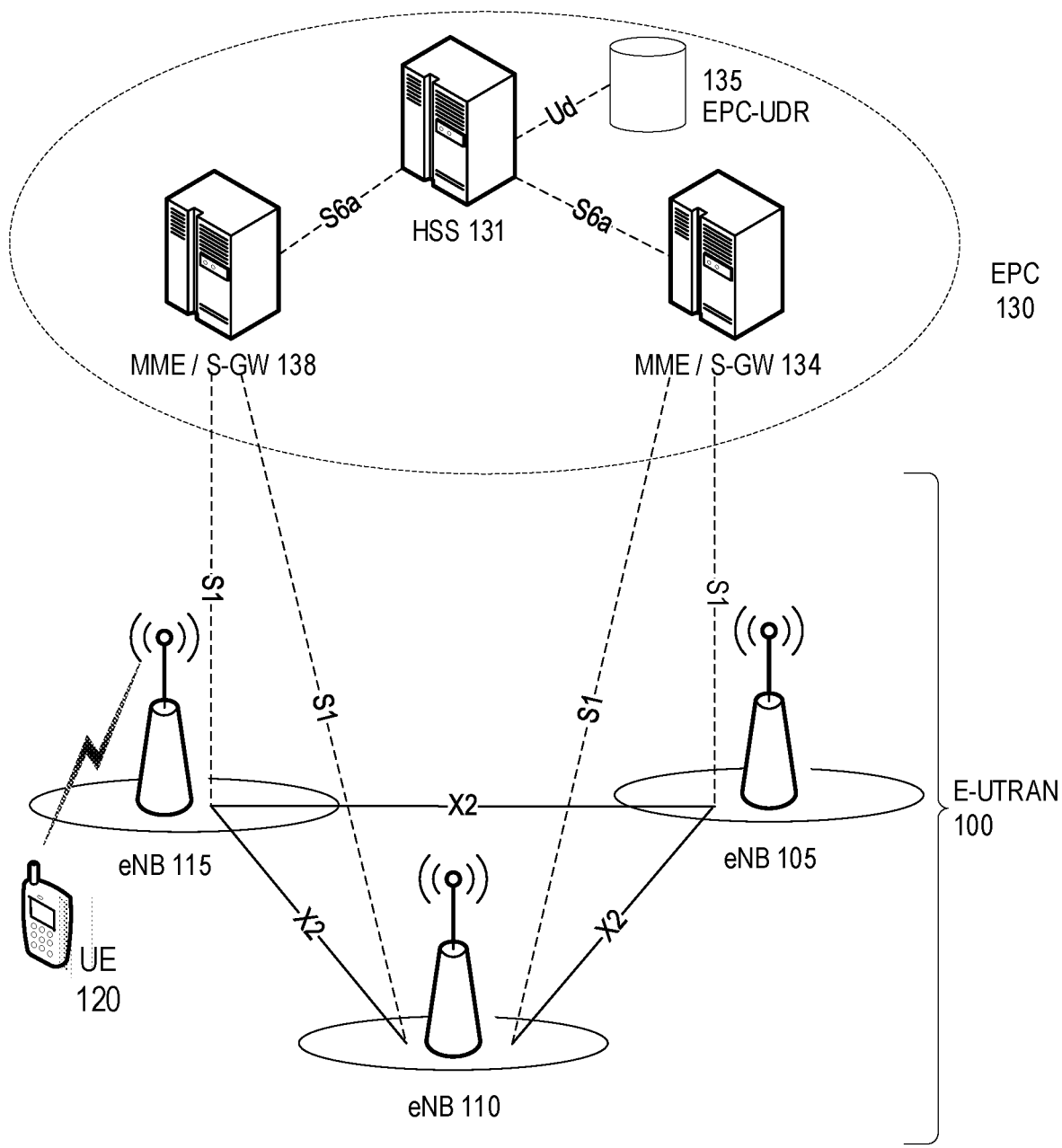
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
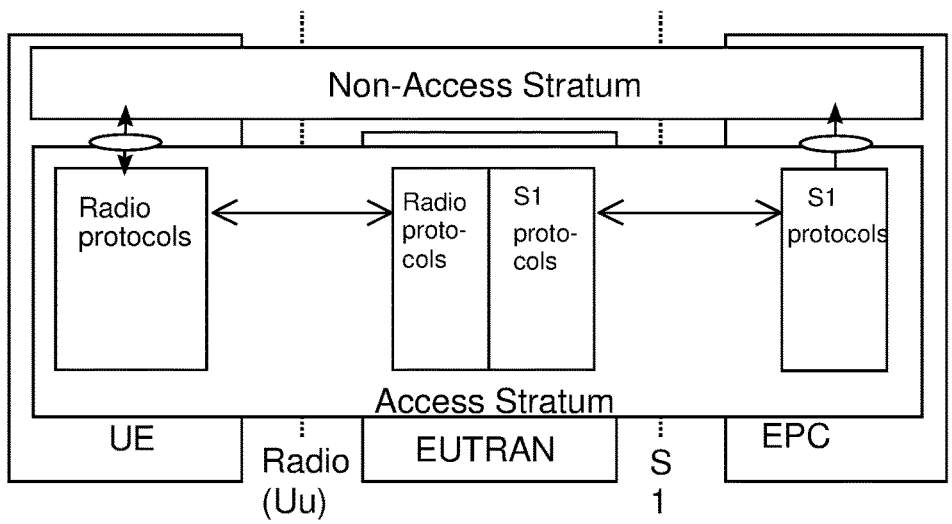
FIG. 2A is a high-level block diagram of an exemplary E-UTRAN architecture in terms of its constituent components, protocols, and interfaces.
Figure 2B:
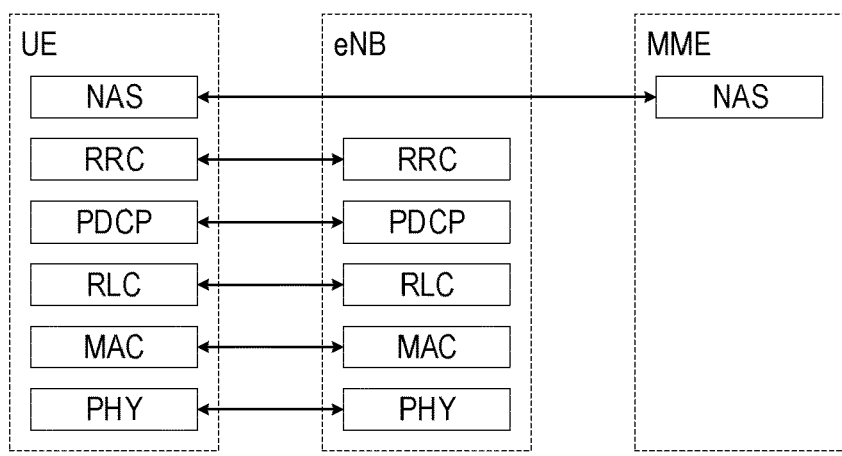
FIG. 2B is a block diagram of exemplary protocol layers of the control-plane portion of the radio (Uu) interface between a user equipment (UE) and the E-UTRAN.
Figure 2C:
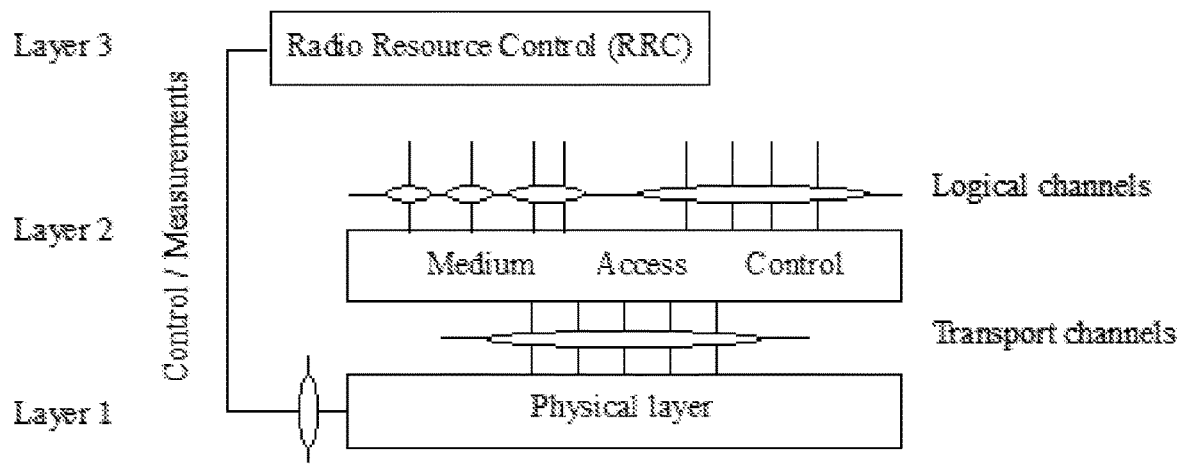
FIG. 2C is a block diagram of an exemplary LTE radio interface protocol architecture from the perspective of the PHY layer.
Figure 3:
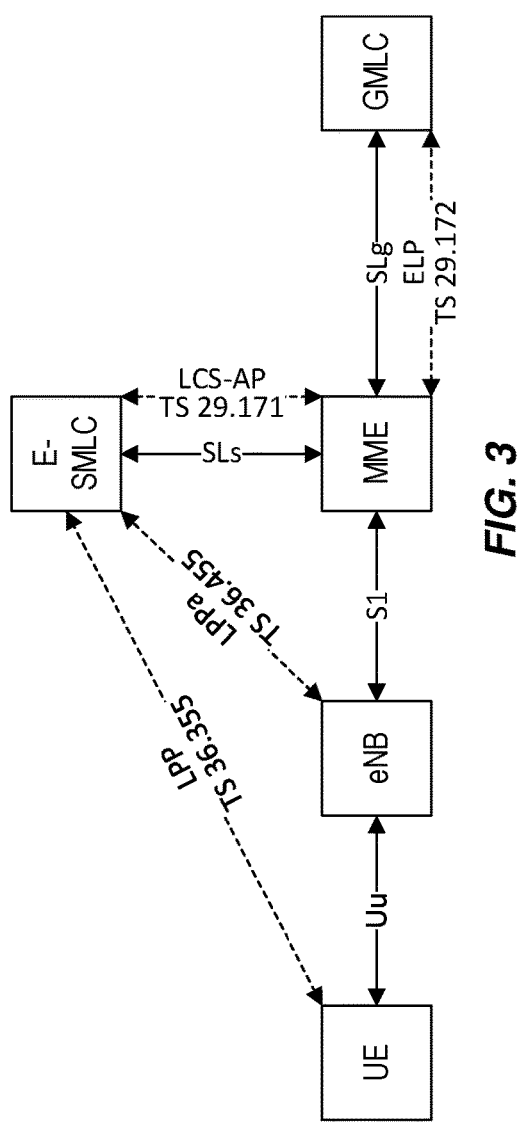
FIG. 3 illustrates a high-level architecture for supporting UE positioning in LTE networks.
Figure 4:
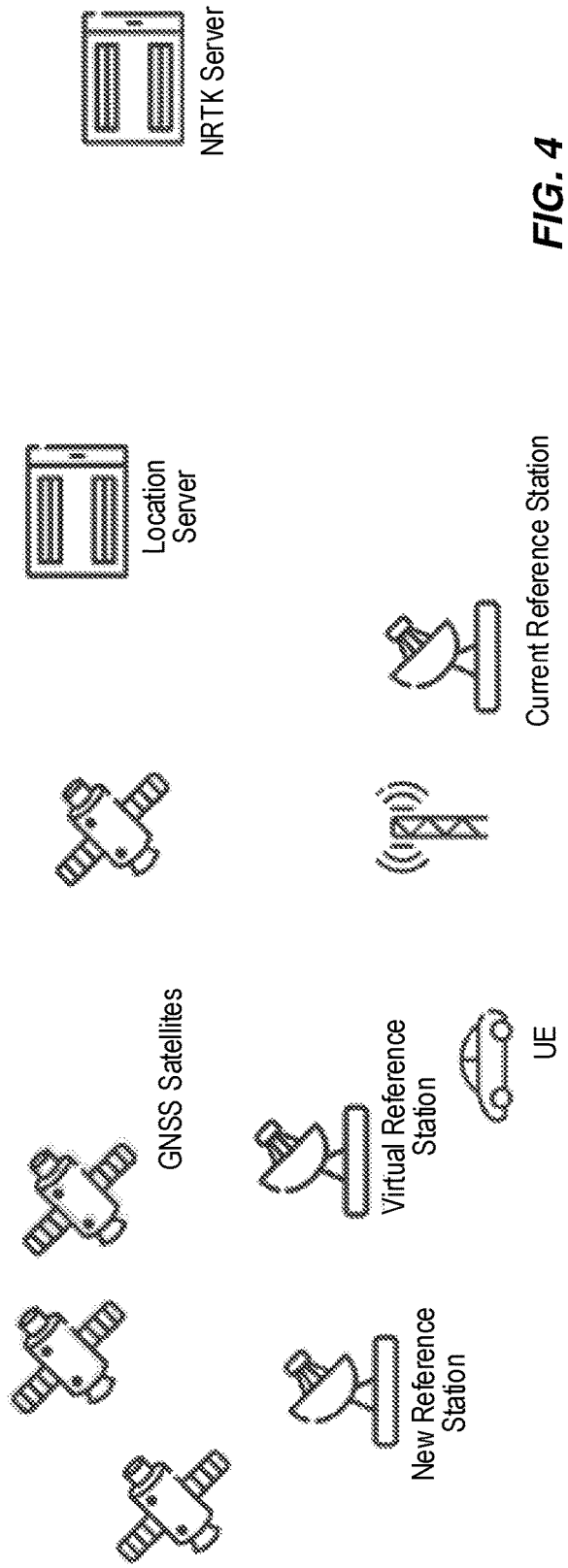
FIG. 4 illustrates an exemplary reference station network usable for UE positioning.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

As briefly mentioned above, the position information of physical or non-physical reference stations are typically represented in the WGS 84 as an earth-referenced, earth-fixed (EREF) coordinate (X, Y, Z). However, these representations are known to be somewhat inaccurate locally, and there can be significant mismatches compared to regional maps, causing significant issues when combining the estimated position with such maps. These issues are discussed in more detail below.

A spatial reference system (SRS) or coordinate reference system (CRS)—referred to herein as "reference system" for short—is a coordinate-based local, regional, or global system usable to locate geographical entities. A reference system generally defines a specific map projection, which is a transformation of a three-dimensional coordinate (e.g., latitude and longitudes on the surface of a sphere or ellipsoid into two-dimensional locations (e.g., on a map). A reference system can also include transformations to/from other reference systems. Reference systems can be defined by the Open Geospatial Consortium's (OGC) Simple feature access using well-known text, and support has been implemented by several standards-based geographic information systems (GIS).

Reference systems can be referenced using a Spatial Reference System Identifier (SRID). An SRID is a unique, integer value used to unambiguously identify projected, unprojected, and local spatial coordinate system definitions. These coordinate systems form the heart of all GIS applications. An exemplary SRID is European Petroleum Survey Group (EPSG) codes, which as of 2005, are maintained by the International Association of Oil & Gas Producers (OGP) Surveying & Positioning Committee. Virtually all major spatial vendors have created their own SRID implementation or refer to those of an authority, such as EPSG.

As noted above, SRIDs are important for the OGC spatial_ref_sys metadata table for the Simple Features for SQL Specification, Versions 1.1 and 1.2, which is defined as follows:

```
CREATE TABLE SPATIAL_REF_SYS
(
    SRID        INTEGER     NOT NULL PRIMARY KEY,
    AUTH_NAME   CHARACTER   VARYING(256),
    AUTH_SRID   INTEGER,
    SRTEXT      CHARACTER   VARYING(2048)
)
```

In spatially enabled databases (such as IBM DB2, IBM Informix, Microsoft SQL Server, MySQL, Oracle RDBMS, Teradata, PostGIS and SQL Anywhere), SRIDs are used to uniquely identify the coordinate systems used to define columns of spatial data or individual spatial objects in a spatial column (depending on the spatial implementation). SRIDs are typically associated with a Well Known Text (WKT) string definition of the coordinate system (SRTEXT, above). For example, the WKT string for SRID2029 (UTM, Zone 17N, NAD27 SRS) is shown in FIG. 5A. As a further example, the WKT string for SRID 4326 (WGS84 SRS) is shown in FIG. 5B.

Positioning has been an important feature in LTE. In LTE the positioning node (e.g. E-SMLC or location server) configures the target device (e.g. UE), an eNB, or a radio node dedicated for positioning measurements (e.g., location measurement unit, LMU) to perform one or more positioning measurements depending upon the positioning method. The positioning measurements are used by the target device, by a measuring node, or by the positioning node to determine the location of the target device. In LTE the positioning node communicates with UE using LTE positioning protocol (LPP) and with eNode B using LTE positioning protocol annex (LPPa).

Figure 6:
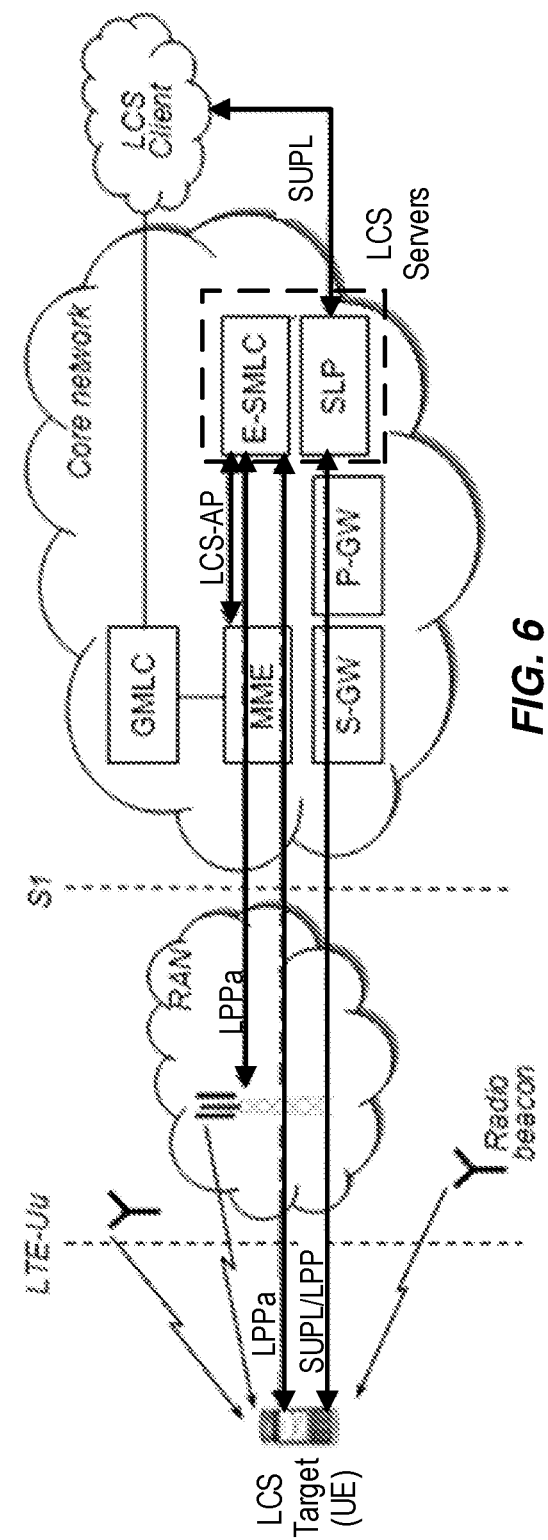
FIG. 6 shows a more detailed view of the LTE positioning architecture.

FIG. 6 shows a more detailed network diagram of the LTE positioning architecture. Three important elements in this architecture are the LCS Client, the LCS target and the LCS Server. LCS Targets are entities being positioned, e.g., a user equipment (UE). An LCS Client is a software and/or hardware entity that interacts with an LCS Server for the purpose of obtaining location information for one or more LCS targets. LCS Clients can also reside in the LCS targets themselves. For example, a UE can include an LCS Client requesting self-positioning. Other nodes in the 3GPP network (e.g., RAN nodes) can include LCS Clients that can request the LCS Server to position LCS Targets operating in the 3GPP network. LCS Clients can also be external to the 3GPP network, such as illustrated in FIG. 6.

The LCS Server is a physical or logical entity managing positioning for an LCS target by collecting measurements and other location information, assisting the terminal in measurements when necessary, and estimating the LCS target location. An LCS Client sends a request to the LCS Server to obtain location information for one or more LCS Targets, and the LCS Server manages the received requests and sends the requested result(s)—and optionally a velocity estimate—to the LCS Client.

Example LCS Servers shown in FIG. 6 include E-SMLC/GMLC and a secure user-plane location platform (SLP). The GMLC interacts with LCS Clients external to the 3GPP network, on behalf of the E-SMLC. Alternately, external LCS Clients can interact directly with the UE via the SLP using the secure user plane location (SUPL) protocol.

Given positioning measurements made by a UE, position calculation can be performed by a positioning server (e.g., E-SMLC or SLP in LTE, LMF in 5G/NR) or a UE. The former approach corresponds to the UE-assisted positioning, while the latter corresponds to the UE-based positioning mode. UEs equipped with GNSS receivers can perform measurements on GNSS satellite signals, which can be used for UE-based or UE-assisted positioning of the UE. Moreover, the UE (or other entity) can obtain observations from one or more physical or non-physical reference stations, which can be used for positioning the UE itself together with the GNSS satellite measurements.

Typically, each GNSS satellite transmits positioning signals (also referred to as "ranging codes") on multiple carrier frequencies. The original Global Positioning System (GPS) satellites utilized two frequencies, one at 1575.42 MHz (L1) and a second at 1227.60 MHz (L2). The pseudorandom C/A ranging code is transmitted on L1 as a 1.023 MHz (or chips/sec) signal using BPSK modulation, while the pseudorandom P(Y) ranging code is transmitted on both the L1 and L2 frequencies as a 10.23 MHz signal using the same BPSK modulation.

Figure 7:
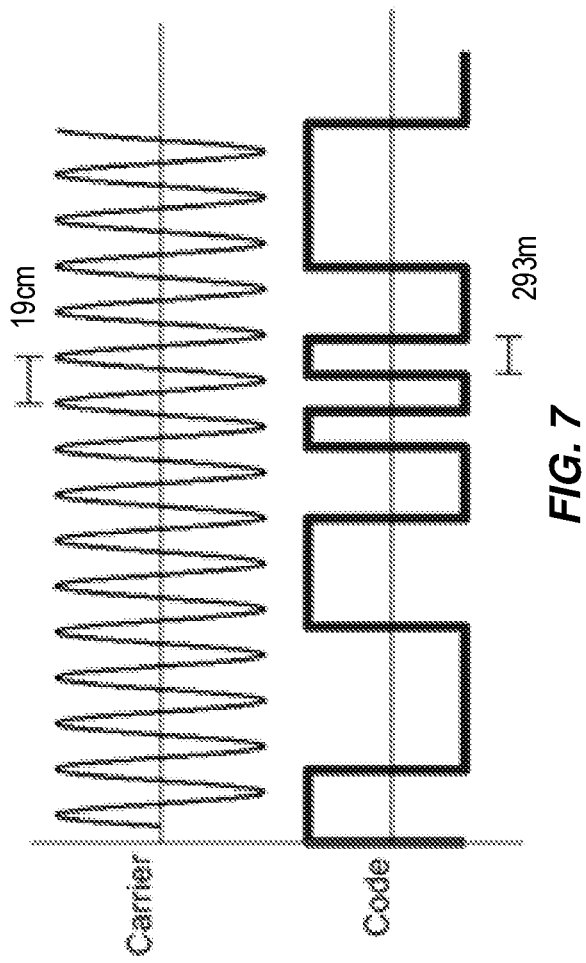
FIG. 7 shows an exemplary relationship between code phase and carrier frequency (or phase) in an L1 signal transmitted by a GPS satellite.

FIG. 7 shows an exemplary relationship between code phase and carrier frequency (or phase) in an L1 signal transmitted by a GPS satellite. The wavelength of the L1 carrier is 0.19 m (19 cm), while the "wavelength" corresponding to the 1.023-MHz chip rate is 293 m. As shown in the figure, the carrier frequency is difficult to count because it's so uniform, i.e., every carrier cycle looks the same. The pseudorandom code, on the other hand is intentionally complex to make it more distinguishable. Put another way, a GNSS receiver's carrier phase measurements (i.e., with a single carrier cycle) can be very accurate, but the number of integer cycles between the receiver and the satellite is generally unknown to the receiver.

However, based on network assistance data with observations, a UE-based GNSS receiver can determine the integer. More specifically, the UE can obtain observations associated with one or more reference station(s), use the observations to estimate the error of GNSS measurements at a certain location (e.g., the UE's location), and to correct the measurements before reporting them to the E-SMLC.

In general, the GNSS receiver measures a phase quantity, $\phi$, related to the geometrical distance (or range) to the satellite, which can be represented as:

$$\phi = \rho - I + Tr + c(b_{Rx} - b_{Sat}) + N\lambda + \varepsilon_\phi, \tag{1}$$

where:
I is the signal path delay due to the ionosphere;
Tr is the signal path delay due to the troposphere;
$b_{Rx}$ is the receiver clock offset front the reference (GPS) time;
$b_{Sat}$ is the satellite clock offset from the reference (GPS) time;
c is the vacuum speed of light;
$\lambda$ is the carrier nominal wavelength;
N is the ambiguity of the carrier-phase (integer number);
$\varepsilon_\phi$ are the measurement noise components, including multipath and other effects;
$\rho$ is the geometrical range between the satellite and the receiver, computed as a function of the satellite position coordinates $(x_{sat}, y_{sat}, z_{sat})$ and receiver position coordinates $(x_{rx}, y_{rx}, z_{rx})$ as:

$$\rho = \sqrt{(x_{Sat}-x_{Rx})^2 + (y_{Sat}-y_{Rx})^2 + (z_{Sat}-z_{Rx})^2}. \tag{2}$$

As mentioned above, the integer number of carrier-phase cycles, N, is generally unknown or ambiguous. In some cases, two different GNSS receivers (a and b, e.g., the UE and a reference station) make simultaneous phase measurements on two different satellites (1 and 2), resulting in four phase measurements ($\phi_a^1$, $\phi_a^2$, $\phi_b^1$, $\phi_b^2$) and two phase-difference measurements, $\phi_a^{12} = \phi_a^1 - \phi_a^2$, $\phi_b^{12} = \phi_b^1 - \phi_b^2$. The receivers can then use the phase measurements to compute a "double difference observable", represented as:

$$\phi_a^{12} - \phi_b^{12} = \rho_a^{12} - \rho_b^{12} - I_a^{12} + I_b^{12} + Tr_a^{12} - Tr_b^{12} + \lambda(N_a^{12} - N_b^{12}) + \varepsilon_a^{12} - \varepsilon_b^{12}, \tag{3}$$

where $$\rho_a^{12} = \rho_a^1 - \rho_a^2 \text{ and } \rho_b^{12} = \rho_b^1 - \rho_b^2, \tag{4}$$

and the respective ranges between satellites 1, 2 having coordinates $\{x_1, y_1, z_1\}$, $\{x_2, y_2, z_2\}$ and receivers a, b having coordinates $\{x_a, y_a, z_a\}$, $\{x_b, y_b, z_b\}$ are given by:

$$\rho_a^1 = (x_1-x_a)^2 + (y_1-y_a)^2 + (z_1-z_a)^2,$$

$$\rho_b^1 = (x_1-x_b)^2 + (y_1-y_b)^2 + (z_1-z_b)^2,$$

$$\rho_a^2 = (x_1-x_a)^2 + (y_1-y_a)^2 + (z_1-z_a)^2,$$

$$\rho_a^2 = (x_1-x_b)^2 + (y_1-y_b)^2 + (z_1-z_b)^2, \tag{5}$$

Within this double difference observable in equation (3), several common error terms cancel out, thereby allowing the UE to compute the previously unknown integer value $N_{ab}^{12} = N_a^{12} - N_b^{12}$. For example, satellite coordinates $\{x_1, y_1, z_1\}$, $\{x_2, y_2, z_2\}$ and reference station receiver coordinates $\{x_b, y_b, z_b\}$ are known very accurately. If the unknown UE receiver coordinates $\{x_a, y_a, z_a\}$ can be estimated to some reasonable degree of accuracy (e.g., the serving base station location), the non-linear expressions for ranges $\rho_a^1$ and $\rho_a^2$ in (5) can be linearized such that unknown UE receiver coordinates $\{x_a, y_a, z_a\}$ will cancel out in the $\rho_a^{12}$ difference term in (3) and (4).

Figure 8:
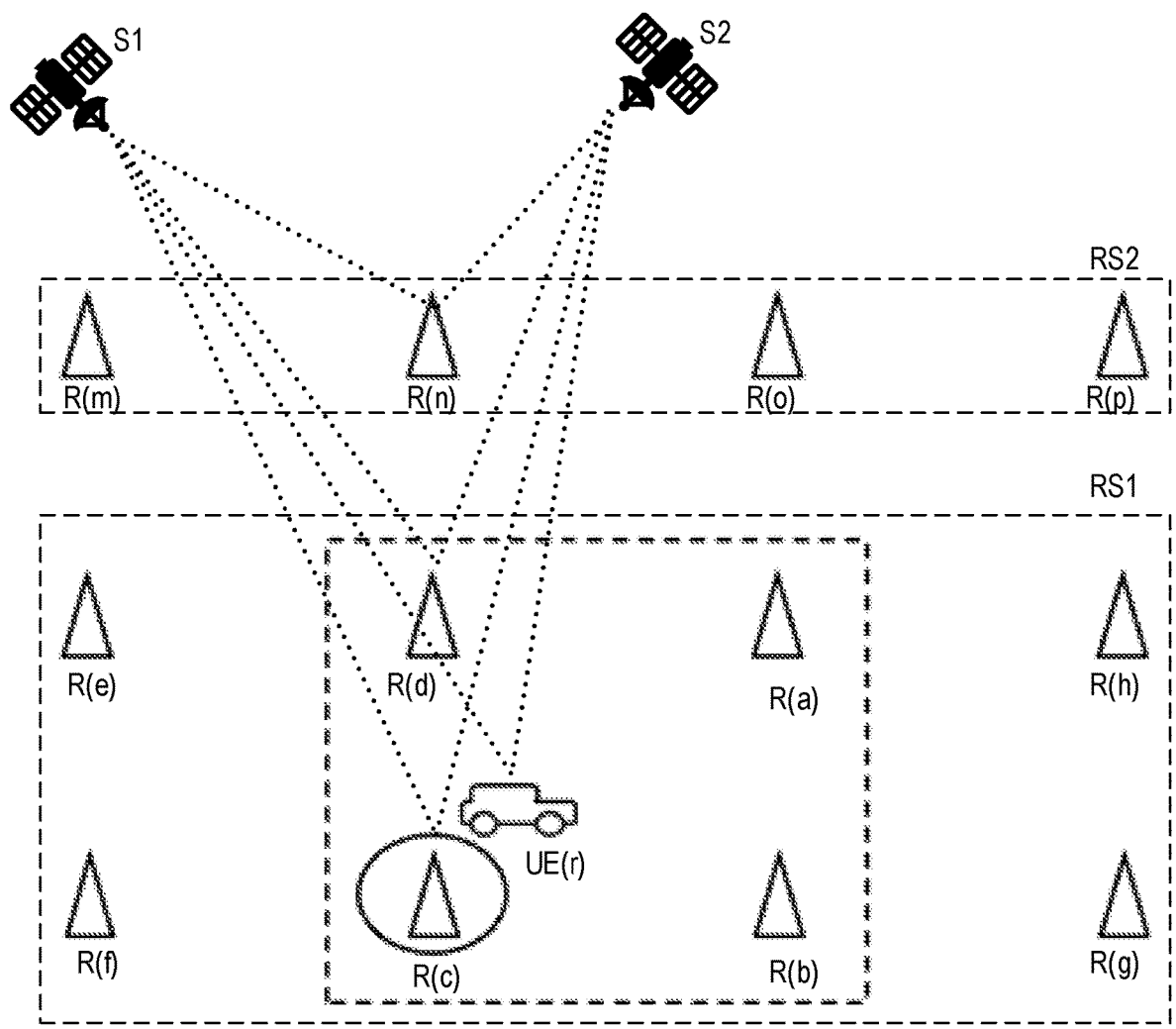
FIG. 8 shows an exemplary arrangement of a UE equipped with a GNSS receiver operating in proximity to a grid of reference stations.

FIG. 8 shows an exemplary arrangement of a UE equipped with a GNSS receiver operating in proximity to a grid of reference stations. In this figure, the UE is assumed to be mobile through the grid, and it thereby labelled "UE(r)" for "rover." The grid includes 12 reference stations labeled R(a)-R(h) and R(m)-R(p). The locations of reference stations R(a)-R(h) are specified in relation to a first reference system, RS1, whereas the locations of reference stations R(m)-R(p) are specified in relation to a second reference system, RS2, that is different from RS1 in some manner UE(r) and all 12 reference stations shown are assumed to be able to receive signals transmitted by GNSS satellites S1 and S2.

As illustrated in FIG. 8, UE(r) is operating in proximity to R(c). In such case, the integer-ambiguity solution computed by UE(r) with respect to R(c), S1, and S2 is:

$$N_{rc}^{12} = (N_r^1 - N_r^2) - (N_c^1 - N_c^2). \tag{6}$$

The UE can receive the two-satellite integer difference $Nc^1 - Nc^2$—measured and/or determined by R(c)—as assistance via the mobile network (e.g., from SMLC/E-SMLC/LMF). Given integer differences for a number of satellite pairs observed by both the UE and R(c), the UE can precisely determine its position relative to R(c), whose position is generally known to a high degree of accuracy.

Since UE(r) is mobile, however, at some point it can become more proximate to a different reference station (e.g., R(d)) than to R(c). In such case, to maintain highest accuracy, the UE should use a two-satellite difference determined by the closer reference station, i.e., $Nd^1 - Nd^2$. Simply switching to this difference, however, would require the UE to restart the integer-ambiguity resolution, resulting in a temporary fall back to positioning based on code phase measurements with much worse positioning accuracy.

Fortunately, the following relationship between differences $N_{rc}^{ij}$ and $N_{cd}^{ij}$ for satellites i, j can be used by the UE to avoid having to restart the integer-ambiguity solution:

$$N_{rd}^{ij} = N_{rc}^{ij} + N_{cd}^{ij} = N_{rc}^{ij} + (N_c^i - N_c^j) - (N_d^i - N_d^j). \tag{7}$$

As briefly mentioned above, the coordinates of assistance data (e.g., reference station locations) are defined with respect to a particular reference system. As such, there can be scenarios where a mobile UE becomes more proximate to a reference station associated with a different reference system than the reference station that the UE is currently using for its integer-ambiguity solution. In the context of FIG. 8, this scenario can occur if the UE operating in proximity to R(d) (associated with RS1) moves such that it becomes more proximate to R(n), which is associated with RS2. In a more practical example, the UE can cross a border between a country (or region) that uses RS1 and a country (or region) that uses RS2.

Typically, there are regional adaptions of reference systems to fit the spatial region considered and to update the reference system relation to earth bounded reference systems. Such regional changes can be necessitated by different amounts of horizontal and vertical movements of different parts of the earth's crust. In general, regional reference systems are better aligned with regional maps than more global reference systems such as WGS84. In view of these and other reasons, different countries (or regions) can use different reference systems. However, this can create difficulties in bordering areas between regions that use different reference systems, such as inaccuracies in integer-ambiguity solutions (and resulting location determinations) when transitioning between reference stations associated with different reference systems.

By facilitating a separate association of the coordinates to a reference system that can be regional, exemplary embodiments of the present disclosure can enable and/or facilitate estimated positions to be aligned with map data associated with a local and/or regional coordinate system.

Figure 12:
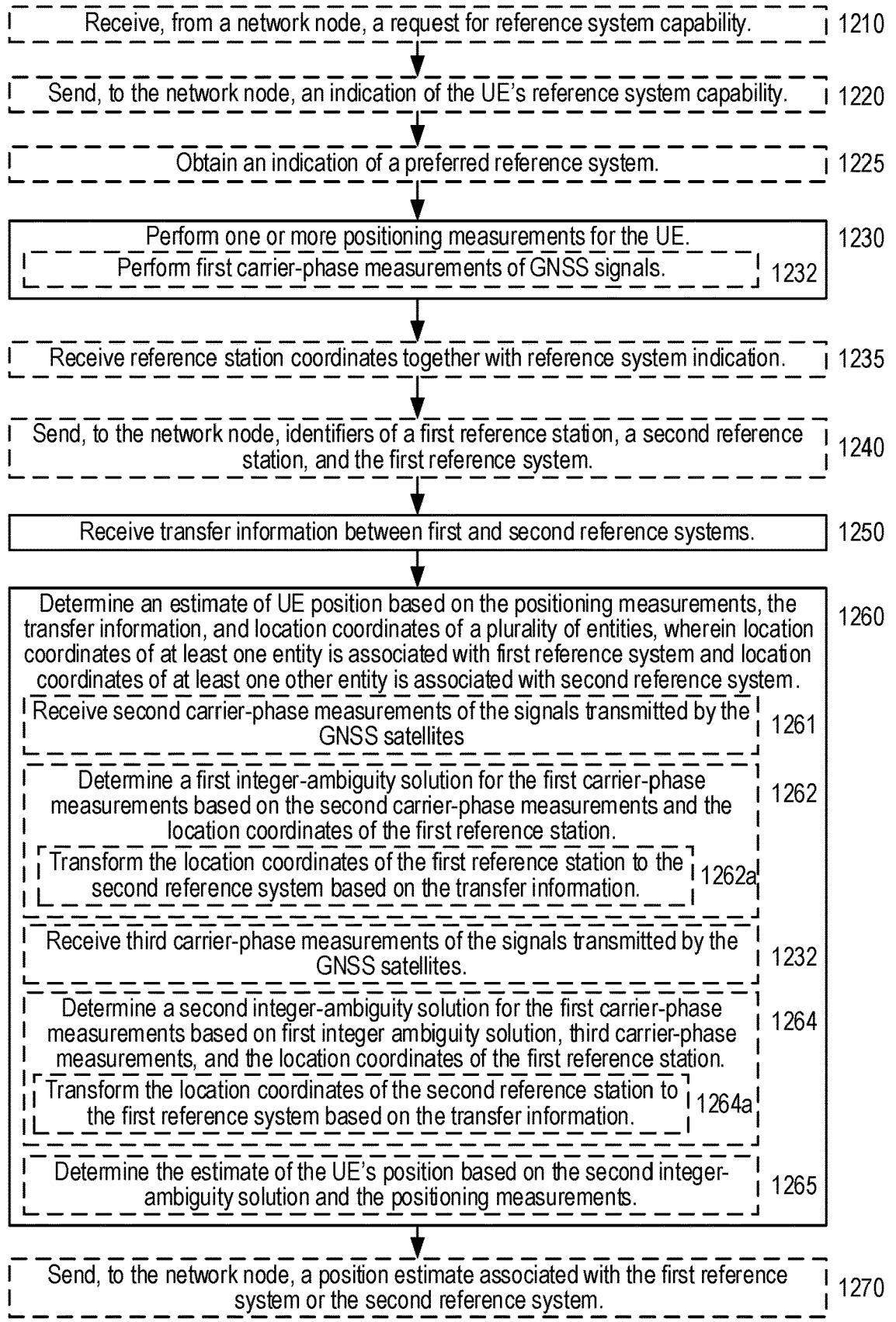
FIG. 12 is a flow diagram illustrating exemplary methods and/or procedures performed by a wireless device and/or UE according to various exemplary embodiments of the present disclosure.

FIG. 12 is a flow diagram illustrating an exemplary method (e.g., procedure) for estimating the position of a user equipment (UE) in association with a plurality of reference stations, according to various exemplary embodiments of the present disclosure. The exemplary method shown in FIG. 12 can be implemented, for example, in a wireless device and/or UE shown in, or described in relation to, other figures herein. Furthermore, the exemplary method shown in FIG. 12 can be utilized cooperatively with other exemplary methods and/or procedures described herein (e.g., FIG. 13) to provide various exemplary benefits described herein. Although FIG. 12 shows blocks in a particular order, this order is merely exemplary and the operations of the exemplary method can be performed in a different order than shown, and can be combined and/or divided into blocks having different functionality than shown. Optional operations are indicated by dashed lines.

In some embodiments, the exemplary method can include the operations of block 1210, in which the UE can receive, from a network node (e.g., an E-SMLC or LMF), a request for reference system capability of the UE. In some embodiments, the exemplary method can also include the operations of block 1220, in which the UE can respond to the request by sending, to the network node, an indication of the UE's reference system capability.

In some embodiments, the exemplary method can also include the operations of block 1225, in which the UE can receive an indication of a preferred reference system. In such embodiments, the preferred reference system can be the first reference system or the second reference system, discussed in more detail below. In various embodiments, the indication of the preferred reference system can be received in any of the following ways: by receiving a message from a wireless network, by receiving an input to a user interface of the UE, or by reading from a memory within the UE.

The exemplary method can also include the operations of block 1230, in which the UE can perform one or more positioning measurements for the UE. In some embodiments, the operations of block 1230 can include the operations of sub-block 1232, where the UE can perform first carrier-phase measurements of signals transmitted by a plurality of global navigation satellite system (GNSS) satellites. In some embodiments, the plurality of GNSS satellites can include a plurality of GPS satellites, and the carrier-phase measurements can be of L1 signals transmitted by the GPS satellites.

In some embodiments, the exemplary method can also include the operations of block 1235, in which the UE can obtain coordinates of a reference station together with an indication of the reference system associated with the reference station (e.g., the reference system of the coordinates). In various embodiments, this can include coordinates of the first reference station together with an indication of the first reference system, and/or coordinates of the second reference station together with an indication of the second reference system. Some examples are shown in FIGS. 15-18. This information can be sent as part of a reference system (RS) transfer indication (which also is referred to herein as "reference system indication").

More generally, the UE can obtain an indication of which coordinate system that is associated to the coordinates for entities of positioning assistance data such as physical and non-physical reference stations, base station positions, transmission and/or reception point positions, road side unit positions, positions of other devices on the ground, in the air, under water, indoors, outdoors, etc.

For example, the UE can obtain an explicit information element describing the reference system of stated coordinates. It can be a specific field of an information element, where coordinates are part of the same information element, or are part of a different information element. In some embodiments, the latest-received information about an associated reference system can be considered, by the UE, as associated to all subsequent information elements that comprise coordinates of entities. In some embodiments, the reference system indication can include two or more indications of reference systems, associated to different groups of entities and their coordinates.

In some embodiments, the reference system indication can be provided by higher layers in the UE, such as a higher layer protocol, based on a message received from a wireless network. For example, the higher layer protocol could be an application layer protocol. In other embodiments, the reference system indication can be pre-configured, either in specification text, as part of the details of a subscription agreement, in a subscriber module (e.g., SIM card) comprising the UE, in an application running on the UE, etc. In other embodiments, the reference system indication can be provided via an interface in the device, such as a human interaction interface, or an application layer interface, where the reference system indication is retrieved from a server.

As an example, the transport layer address of the server can be retrieved via domain name server lookup, where the domain name is compiled based on operator information such as mobile network code (MNC) and mobile country code (MCC) (specified in 3GPP TS 23.003), with tag extensions corresponding to reference system information retrieval such as: posinfo.mnc<MNC>.mcc<MCC>.3gppnetwork.org. For example, Telia Sweden has MNC 01 and MCC 240, which gives the fully qualified domain name (FQDN): posinfo.mnc01.mcc240.3gppnetwork.org. Additional information can be added to the FQDN such as tracking area, etc.

In other embodiments, there can be an implicit rather than explicit relationship between the received reference station coordinates and a reference system. For example, the received coordinates can be associated to a previously received reference system indication in various ways. In other embodiments, the received coordinates can be associated to a later received reference system indication in various ways. In such embodiments, the determination of the relationship must be delayed until both coordinates and reference system indication are obtained.

In some embodiments, the exemplary method can also include the operations of block 1240, in which the UE can send, to a wireless network, identifiers of the first reference station, a second reference station, and the first reference system. In some embodiments, this information can be sent as part of a reference system (RS) transfer request.

The exemplary method can also include the operations of block 1250, in which the UE can receive transfer information between the first reference system and a second reference system. In some embodiments, the UE can receive this transfer information from the wireless network in response to sending the identifiers in block 1240. In such embodiments, this transfer information can be sent as part of a RS transfer indication (also referred to herein as "reference system indication"). In some embodiments, the transfer information can be related to one or more pairs of GNSS satellites.

The exemplary method can also include the operations of block 1260, in which the UE can determine an estimate of the UE's position based on the positioning measurements, the transfer information, and location coordinates of a plurality of entities. The location coordinates of at least one entity can be associated with the first reference system and location coordinates of at least one other entity can be associated with the second reference system. In various embodiments, the plurality of entities can include any of the following: physical reference station, virtual reference station, serving network node for the UE, neighbor network node, network transmission or reception point, global navigation satellite system, GNSS, satellite, and another UE. For ease of understanding, however, the following explanation will focus on two entities: the first reference station (physical or virtual) and the second reference station (physical or virtual).

In some embodiments, the operations of block 1260 can include the operations of sub-block 1261, where the UE can receive second carrier-phase measurements of the signals transmitted by the GNSS satellites. The second carrier-phase measurements can be made by a first reference station associated with the first reference system. In such embodiments, the operations of block 1260 can also include the operations of sub-block 1262, where the UE can determine a first integer-ambiguity solution for the first carrier-phase measurements based on the second carrier-phase measurements and the location coordinates of the first reference station (e.g., received in block 1235).

In some embodiments, the operations of sub-block 1262 can include the operations of sub-block 1262a, where the UE can transform the location coordinates of the first reference station to the second reference system based on the transfer information. In such embodiments, the first integer-ambiguity solution can be determined based on the transformed location coordinates of the first reference station.

In some embodiments, the operations of block 1260 can also include the operations of sub-block 1263, where the UE can receive third carrier-phase measurements of the signals transmitted by the GNSS satellites. The third carrier-phase measurements can be made by a second reference station associated with the second reference system. In such embodiments, the operations of block 1260 can also include the operations of sub-block 1264, where the UE can determine a second integer-ambiguity solution for the first carrier-phase measurements based on the following: the first integer-ambiguity solution, the third carrier-phase measurements, and location coordinates of the second reference station (e.g., received in block 1235).

In some embodiments, the operations of sub-block 1264 can include the operations of sub-block 1264a, where the UE can transform the location coordinates of the second reference station to the first reference system based on the transfer information. In such embodiments, the second integer-ambiguity solution is determined based on the transformed location coordinates of the second reference station.

In some embodiments, the operations of block 1260 can also include the operations of sub-block 1265, where the UE can determine the estimate of the UE's position based on the second integer-ambiguity solution and the positioning measurements. In some embodiments, the UE's position can be determined in relation to the second reference system (e.g., when the first reference station coordinates have been transformed to the second reference system). In other embodiments, the UE's position can be determined in relation to the first reference system (e.g., when the second reference station coordinates have been transformed to the first reference system).

In some embodiments, the exemplary method can also include the operations of block 1280, in which the UE can send, to the network node, the estimate of the UE's position associated with either the first reference system or the second reference system. This can depend, for example, on the reference system used to determine the UE's position (e.g., in sub-block 1265). Furthermore, in case the UE previously obtained an indication of a preferred reference system (e.g., in block 1225), the UE position estimate can be associated with the preferred reference system.

Figure 13:
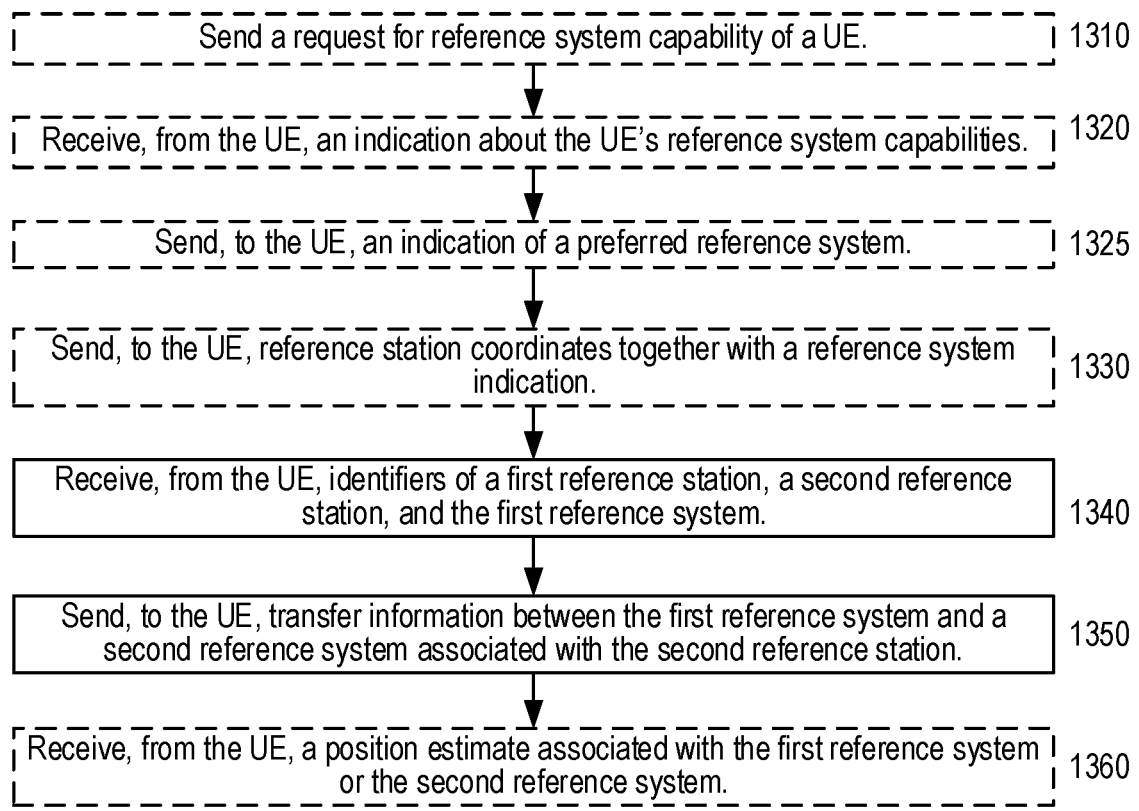
FIG. 13 is a flow diagram illustrating exemplary methods and/or procedures performed by a network node (e.g., positioning server, base station, eNB, E-SMLC, gNB, LMF, etc. or component thereof) according to various exemplary embodiments of the present disclosure.

FIG. 13 is a flow diagram illustrating an exemplary method (e.g., procedure) for assisting the positioning of a user equipment (UE) in association with a plurality of reference stations, according to various exemplary embodiments of the present disclosure. The exemplary method shown in FIG. 13 can be implemented, for example, in a network node (e.g., positioning server, base station, eNB, E-SMLC, gNB, LMF, etc. or component thereof) shown in, or described in relation to, other figures herein. Furthermore, the exemplary method shown in FIG. 13 can be utilized cooperatively with other exemplary methods and/or procedures described herein (e.g., FIG. 12) to provide various exemplary benefits described herein. In addition, although FIG. 13 shows blocks in a particular order, this order is merely exemplary and the operations of the exemplary method can be performed in a different order than shown, and can be combined and/or divided into blocks having different functionality than shown. Optional operations are indicated by dashed lines.

In some embodiments, the exemplary method can include the operations of block 1310, in which the network node can send, to the UE, a request for reference system capability of the UE. In some embodiments, the exemplary method can also include the operations of block 1320, in which the network node can receive, in response from the UE, an indication of the UE's reference system capability. In some embodiments, the exemplary method can also include the operations of block 1325, in which the network can send, to the UE, an indication of a preferred reference system. In such embodiments, the preferred reference system can be the first reference system or the second reference system, discussed in more detail below.

In some embodiments, the exemplary method can also include the operations of block 1330, in which the network node can send, to the UE, coordinates of a reference station together with an indication of the reference system associated with the reference station (e.g., the reference system of the coordinates). In various embodiments, this can include coordinates of the first reference station together with an indication of the first reference system, and/or coordinates of the second reference station together with an indication of the second reference system.

More generally, the network can send an indication of which coordinate system that is associated to the coordinates for entities of positioning assistance data such as physical and non-physical reference stations, base station positions, transmission and/or reception point positions, road side unit positions, positions of other devices on the ground, in the air, under water, indoors, outdoors, etc. Furthermore, the various examples described above in relation to block 1235 of FIG. 12 are equally applicable to block 1330 of FIG. 13, including the examples shown in FIGS. 15-18.

In other embodiments, there can be an implicit rather than explicit relationship between the transmitted reference station coordinates and a reference system. For example, the transmitted coordinates can be associated to a previously transmitted reference system indication in various ways. In other embodiments, the transmitted coordinates can be associated to a later transmitted reference system indication in various ways. In such embodiments, the determination of the relationship (e.g., by the UE) must be delayed until both coordinates and reference system indication are obtained.

The exemplary method illustrated in FIG. 13 also includes the operations of block 1340, in which the network node can receive, from the UE, identifiers of a first reference station, a second reference station, and a first reference system associated with the first reference station. In some embodiments, this information can be received as part of a reference system (RS) transfer request.

The exemplary method can also include the operations of block 1350, in which the network node can send, to the UE, transfer information between the first reference system and a second reference system associated with the second reference station. In some embodiments, the network node can send this transfer information to the UE in response to receiving the identifiers in block 1340. In such embodiments, this transfer information can be sent as part of a reference system (RS) transfer indication (which also is referred to herein as "reference system indication"). In some exemplary embodiments, the transfer information can be related to one or more pairs of GNSS satellites.

In some embodiments, the exemplary method can also include the operations of block 1360, in which the network node can receive, from the UE, an estimate of the UE's position associated with the first reference system or the second reference system. In case the network node previously provided the UE with a preferred reference system (e.g., in block 1325), the UE position estimate can be associated with the preferred reference system.

Figure 14:
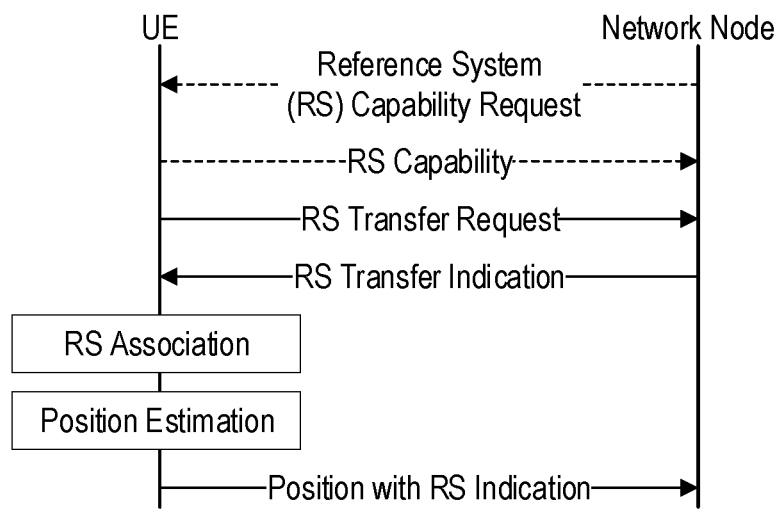
FIG. 14 is a flow diagram illustrating operations between a UE and network node, according to various exemplary embodiments of the present disclosure.

An alternate view of the exemplary operations illustrated in FIGS. 12-13 is shown in FIG. 14, which is a flow diagram illustrating interactive operations between the UE and the network node, according to various exemplary embodiments of the present disclosure. In addition, FIGS. 15-18 illustrate various exemplary signaling messages usable for the communication between UE and network node according to these exemplary embodiments. More specifically, FIGS. 15-18 illustrate an ASN.1 code specification of exemplary GNSS Assistance Data signaling between a UE and a network node.

FIGS. 15A-B illustrate an exemplary GNSS-RTK-ReferenceStationInfo message and/or information element (IE). The exemplary GNSS-RTK-ReferenceStationInfo IE can be used by the location server to provide the Earth-centered, Earth-fixed (ECEF) coordinates, or coordinates in the optionally configured geodetic reference frame, of the antenna reference point (ARP) of the stationary reference station for which the GNSS-RTK-Observations assistance data are provided together with reference station antenna description. The parameters provided in the exemplary GNSS-RTK-ReferenceStationInfo are used as specified for message type 1006, 1033 and 1032 as defined in 3GPP TS 36.355.

FIGS. 16A-B illustrate an exemplary GNSS-RTK-AuxiliaryStationData message and/or information element (IE). The exemplary GNSS-RTK-AuxiliaryStationData IE can be used by the location server to provide the coordinates of the antenna reference point (ARP) of Auxiliary Reference Stations, relative to the coordinates provided in IE GNSS-RTK-ReferenceStationInfo. The reference station provided in IE GNSS-RTK-ReferenceStationInfo is the Master Reference Station. As such, one Master Reference Station with its associated Auxiliary Stations is used in a single Provide Assistance Data message. The parameters provided in IE GNSS-RTK-AuxiliaryStationData are used as specified for message type 1014 as defined in 3GPP TS 36.355.

FIGS. 17A-B illustrate another exemplary GNSS-RTK-ReferenceStationInfo message and/or information element (IE). In this embodiment, the coordinates in the alternative reference system (e.g., reference frame) is provided in addition to the ECEF WGS84 coordinates. FIG. 17B shows the definitions for these additional elements only; other elements in the ASN.1 data structure of FIG. 17A are defined as in FIG. 15B.

Similarly, FIGS. 18A-B illustrate another exemplary GNSS-RTK-AuxiliaryStationData message and/or information element (IE). In this embodiment, the coordinates in the alternative reference system (e.g., reference frame) is provided in addition to the ECEF WGS84 coordinates. FIG. 18B shows the definitions for these additional elements only; other elements in the ASN.1 data structure of FIG. 18A are defined as in FIG. 16B.

Figure 9:
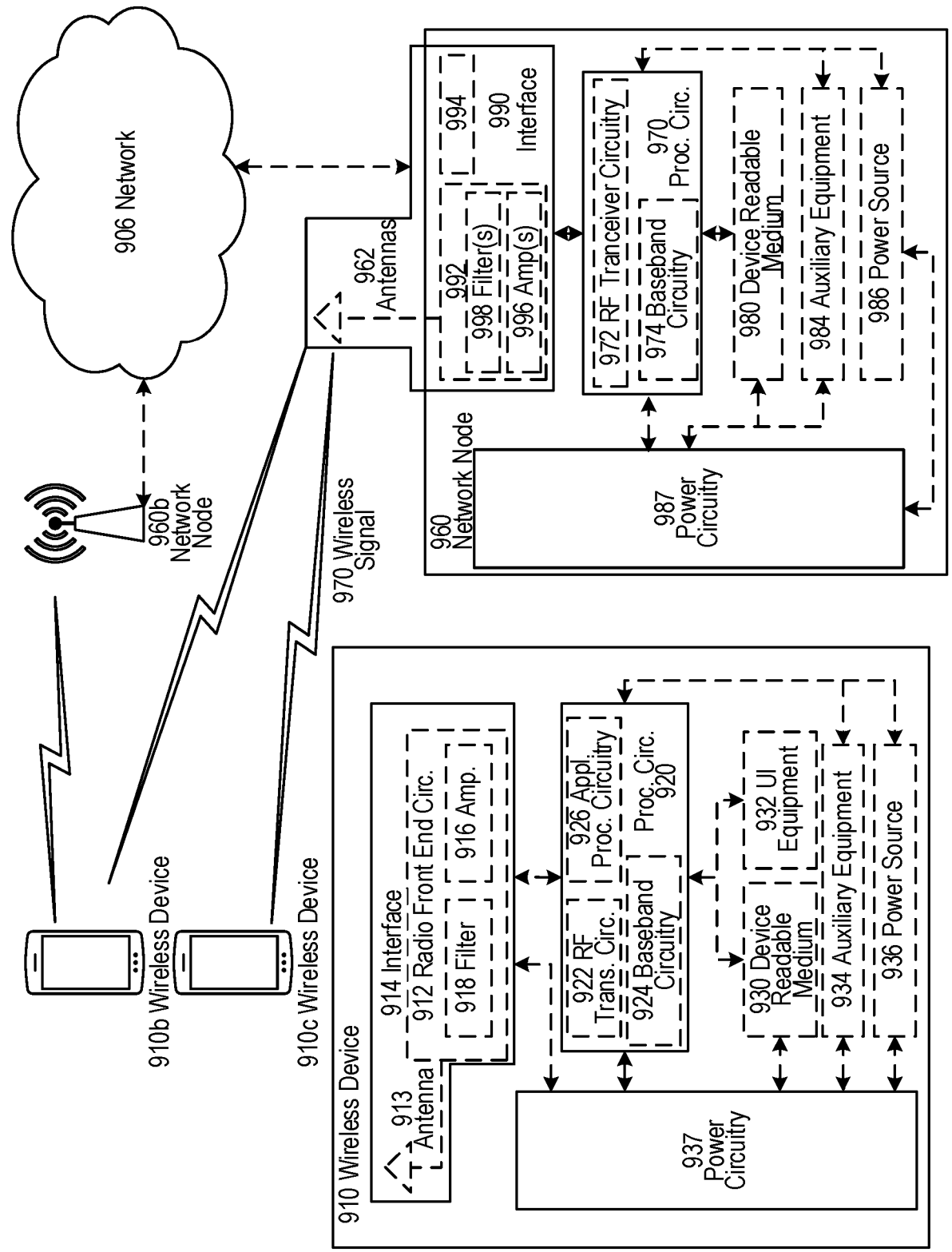
FIG. 9 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and WDs 910, 910b, and 910c. In practice, a wireless network can further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 960 are depicted as single boxes located within a larger box, or nested within multiple boxes, in practice, a network node can comprise multiple different physical components that make up a single illustrated component (e.g., device readable medium 980 can comprise multiple separate hard drives as well as multiple RAM modules).

Similarly, network node 960 can be composed of multiple physically separate components (e.g., a NodeB component and a RNC component, or a BTS component and a BSC component, etc.), which can each have their own respective components. In certain scenarios in which network node 960 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 960 can be configured to support multiple radio access technologies (RATs). In such embodiments, some components can be duplicated (e.g., separate device readable medium 980 for the different RATs) and some components can be reused (e.g., the same antenna 962 can be shared by the RATs). Network node 960 can also include multiple sets of the various illustrated components for different wireless technologies integrated into network node 960, such as, for example, GSM, WCDMA, LTE, NR, WiFi, or Bluetooth wireless technologies. These wireless technologies can be integrated into the same or different chip or set of chips and other components within network node 960.

Processing circuitry 970 can be configured to perform any determining, calculating, or similar operations (e.g., certain obtaining operations) described herein as being provided by a network node. These operations performed by processing circuitry 970 can include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 can execute instructions stored in device readable medium 980 or in memory within processing circuitry 970. Such functionality can include providing any of the various wireless features, functions, or benefits discussed herein. In some embodiments, processing circuitry 970 can include a system on a chip (SOC).

In some embodiments, processing circuitry 970 can include one or more of radio frequency (RF) transceiver circuitry 972 and baseband processing circuitry 974. In some embodiments, radio frequency (RF) transceiver circuitry 972 and baseband processing circuitry 974 can be on separate chips (or sets of chips), boards, or units, such as radio units and digital units. In alternative embodiments, part or all of RF transceiver circuitry 972 and baseband processing circuitry 974 can be on the same chip or set of chips, boards, or units In certain embodiments, some or all of the functionality described herein as being provided by a network node, base station, eNB or other such network device can be performed by processing circuitry 970 executing instructions stored on device readable medium 980 or memory within processing circuitry 970. In alternative embodiments, some or all of the functionality can be provided by processing circuitry 970 without executing instructions stored on a separate or discrete device readable medium, such as in a hard-wired manner In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 970. Device readable medium 980 can store any suitable instructions, data or information, including a computer program, software, an application including one or more of logic, rules, code, tables, etc. and/or other instructions capable of being executed by processing circuitry 970 and, utilized by network node 960. For example, medium 980 can store computer-executable instructions (e.g., in the form of a computer program product) that, when executed by processing circuitry 970, can configure node 960 to perform various exemplary methods and/or procedures described herein.

Device readable medium 980 can be used to store any calculations made by processing circuitry 970 and/or any data received via interface 990. In some embodiments, processing circuitry 970 and device readable medium 980 can be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that can be coupled to, or in certain embodiments a part of, antenna 962. Radio front end circuitry 992 comprises filters 998 and amplifiers 996. Radio front end circuitry 992 can be connected to antenna 962 and processing circuitry 970. Radio front end circuitry can be configured to condition signals communicated between antenna 962 and processing circuitry 970. Radio front end circuitry 992 can receive digital data that is to be sent out to other network nodes or WDs via a wireless connection. Radio front end circuitry 992 can convert the digital data into a radio signal having the appropriate channel and bandwidth parameters using a combination of filters 998 and/or amplifiers 996. The radio signal can then be transmitted via antenna 962. Similarly, when receiving data, antenna 962 can collect radio signals which are then converted into digital data by radio front end circuitry 992. The digital data can be passed to processing circuitry 970. In other embodiments, the interface can comprise different components and/or different combinations of components.

In certain alternative embodiments, network node 960 may not include separate radio front end circuitry 992, instead, processing circuitry 970 can comprise radio front end circuitry and can be connected to antenna 962 without separate radio front end circuitry 992. Similarly, in some embodiments, all or some of RF transceiver circuitry 972 can be considered a part of interface 990. In still other embodiments, interface 990 can include one or more ports or terminals 994, radio front end circuitry 992, and RF transceiver circuitry 972, as part of a radio unit (not shown), and interface 990 can communicate with baseband processing circuitry 974, which is part of a digital unit (not shown).

Antenna 962 can include one or more antennas, or antenna arrays, configured to send and/or receive wireless signals. Antenna 962 can be coupled to radio front end circuitry 990 and can be any type of antenna capable of transmitting and receiving data and/or signals wirelessly. In some embodiments, antenna 962 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 962 can be separate from network node 960 and can be connectable to network node 960 through an interface or port.

Antenna 962, interface 990, and/or processing circuitry 970 can be configured to perform any receiving operations and/or certain obtaining operations described herein as being performed by a network node. Any information, data and/or signals can be received from a wireless device, another network node and/or any other network equipment. Similarly, antenna 962, interface 990, and/or processing circuitry 970 can be configured to perform any transmitting operations described herein as being performed by a network node. Any information, data and/or signals can be transmitted to a wireless device, another network node and/or any other network equipment.

Power circuitry 987 can comprise, or be coupled to, power management circuitry and can be configured to supply the components of network node 960 with power for performing the functionality described herein. Power circuitry 987 can receive power from power source 986. Power source 986 and/or power circuitry 987 can be configured to provide power to the various components of network node 960 in a form suitable for the respective components (e.g., at a voltage and current level needed for each respective component). Power source 986 can either be included in, or external to, power circuitry 987 and/or network node 960. For example, network node 960 can be connectable to an external power source (e.g., an electricity outlet) via an input circuitry or interface such as an electrical cable, whereby the external power source supplies power to power circuitry 987. As a further example, power source 986 can comprise a source of power in the form of a battery or battery pack which is connected to, or integrated in, power circuitry 987. The battery can provide backup power should the external power source fail. Other types of power sources, such as photovoltaic devices, can also be used.

Alternative embodiments of network node 960 can include additional components beyond those shown in FIG. 9 that can be responsible for providing certain aspects of the network node's functionality, including any of the functionality described herein and/or any functionality necessary to support the subject matter described herein. For example, network node 960 can include user interface equipment to allow and/or facilitate input of information into network node 960 and to allow and/or facilitate output of information from network node 960. This can allow and/or facilitate a user to perform diagnostic, maintenance, repair, and other administrative functions for network node 960.

In some embodiments, a wireless device (WD) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 can include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies can be integrated into the same or different chips or set of chips as other components within WD 910.

Antenna 911 can include one or more antennas or antenna arrays, configured to send and/or receive wireless signals, and is connected to interface 914. In certain alternative embodiments, antenna 911 can be separate from WD 910 and be connectable to WD 910 through an interface or port. Antenna 911, interface 914, and/or processing circuitry 920 can be configured to perform any receiving or transmitting operations described herein as being performed by a WD. Any information, data and/or signals can be received from a network node and/or another WD. In some embodiments, radio front end circuitry and/or antenna 911 can be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and can be configured to condition signals communicated between antenna 911 and processing circuitry 920. Radio front end circuitry 912 can be coupled to or a part of antenna 911. In some embodiments, WD 910 may not include separate radio front end circuitry 912; rather, processing circuitry 920 can comprise radio front end circuitry and can be connected to antenna 911. Similarly, in some embodiments, some or all of RF transceiver circuitry 922 can be considered a part of interface 914. Radio front end circuitry 912 can receive digital data that is to be sent out to other network nodes or WDs via a wireless connection. Radio front end circuitry 912 can convert the digital data into a radio signal having the appropriate channel and bandwidth parameters using a combination of filters 918 and/or amplifiers 916. The radio signal can then be transmitted via antenna 911. Similarly, when receiving data, antenna 911 can collect radio signals which are then converted into digital data by radio front end circuitry 912. The digital data can be passed to processing circuitry 920. In other embodiments, the interface can comprise different components and/or different combinations of components.

Processing circuitry 920 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality can include providing any of the various wireless features or benefits discussed herein. For example, processing circuitry 920 can execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry can comprise different components and/or different combinations of components. In certain embodiments processing circuitry 920 of WD 910 can comprise a SOC. In some embodiments, RF transceiver circuitry 922, baseband processing circuitry 924, and application processing circuitry 926 can be on separate chips or sets of chips. In alternative embodiments, part or all of baseband processing circuitry 924 and application processing circuitry 926 can be combined into one chip or set of chips, and RF transceiver circuitry 922 can be on a separate chip or set of chips. In still alternative embodiments, part or all of RF transceiver circuitry 922 and baseband processing circuitry 924 can be on the same chip or set of chips, and application processing circuitry 926 can be on a separate chip or set of chips. In yet other alternative embodiments, part or all of RF transceiver circuitry 922, baseband processing circuitry 924, and application processing circuitry 926 can be combined in the same chip or set of chips. In some embodiments, RF transceiver circuitry 922 can be a part of interface 914. RF transceiver circuitry 922 can condition RF signals for processing circuitry 920.

In certain embodiments, some or all of the functionality described herein as being performed by a WD can be provided by processing circuitry 920 executing instructions stored on device readable medium 930, which in certain embodiments can be a computer-readable storage medium. In alternative embodiments, some or all of the functionality can be provided by processing circuitry 920 without executing instructions stored on a separate or discrete device readable storage medium, such as in a hard-wired manner In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 can be configured to perform any determining, calculating, or similar operations (e.g., certain obtaining operations) described herein as being performed by a WD. These operations, as performed by processing circuitry 920, can include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 can be operable to store a computer program, software, an application including one or more of logic, rules, code, tables, etc. and/or other instructions capable of being executed by processing circuitry 920. For example, medium 930 can store computer-executable instructions (e.g., in the form of a computer program product) that, when executed by processing circuitry 920, can configure device 910 to perform various exemplary methods and/or procedures described herein.

Device readable medium 930 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 920. In some embodiments, processing circuitry 920 and device readable medium 930 can be considered to be integrated.

User interface equipment 932 can include components that allow and/or facilitate a human user to interact with WD 910. Such interaction can be of many forms, such as visual, audial, tactile, etc. User interface equipment 932 can be operable to produce output to the user and to allow and/or facilitate the user to provide input to WD 910. The type of interaction can vary depending on the type of user interface equipment 932 installed in WD 910. For example, if WD 910 is a smart phone, the interaction can be via a touch screen; if WD 910 is a smart meter, the interaction can be through a screen that provides usage (e.g., the number of gallons used) or a speaker that provides an audible alert (e.g., if smoke is detected). User interface equipment 932 can include input interfaces, devices and circuits, and output interfaces, devices and circuits. User interface equipment 932 can be configured to allow and/or facilitate input of information into WD 910, and is connected to processing circuitry 920 to allow and/or facilitate processing circuitry 920 to process the input information. User interface equipment 932 can include, for example, a microphone, a proximity or other sensor, keys/buttons, a touch display, one or more cameras, a USB port, or other input circuitry. User interface equipment 932 is also configured to allow and/or facilitate output of information from WD 910, and to allow and/or facilitate processing circuitry 920 to output information from WD 910. User interface equipment 932 can include, for example, a speaker, a display, vibrating circuitry, a USB port, a headphone interface, or other output circuitry. Using one or more input and output interfaces, devices, and circuits, of user interface equipment 932, WD 910 can communicate with end users and/or the wireless network, and allow and/or facilitate them to benefit from the functionality described herein.

Auxiliary equipment 934 is operable to provide more specific functionality which may not be generally performed by WDs. This can comprise specialized sensors for doing measurements for various purposes, interfaces for additional types of communication such as wired communications etc. The inclusion and type of components of auxiliary equipment 934 can vary depending on the embodiment and/or scenario.

Power source 936 can, in some embodiments, be in the form of a battery or battery pack. Other types of power sources, such as an external power source (e.g., an electricity outlet), photovoltaic devices or power cells, can also be used. WD 910 can further comprise power circuitry 937 for delivering power from power source 936 to the various parts of WD 910 which need power from power source 936 to carry out any functionality described or indicated herein. Power circuitry 937 can in certain embodiments comprise power management circuitry. Power circuitry 937 can additionally or alternatively be operable to receive power from an external power source; in which case WD 910 can be connectable to the external power source (such as an electricity outlet) via input circuitry or an interface such as an electrical power cable. Power circuitry 937 can also in certain embodiments be operable to deliver power from an external power source to power source 936. This can be, for example, for the charging of power source 936. Power circuitry 937 can perform any converting or other modification to the power from power source 936 to make it suitable for supply to the respective components of WD 910.

Figure 10:
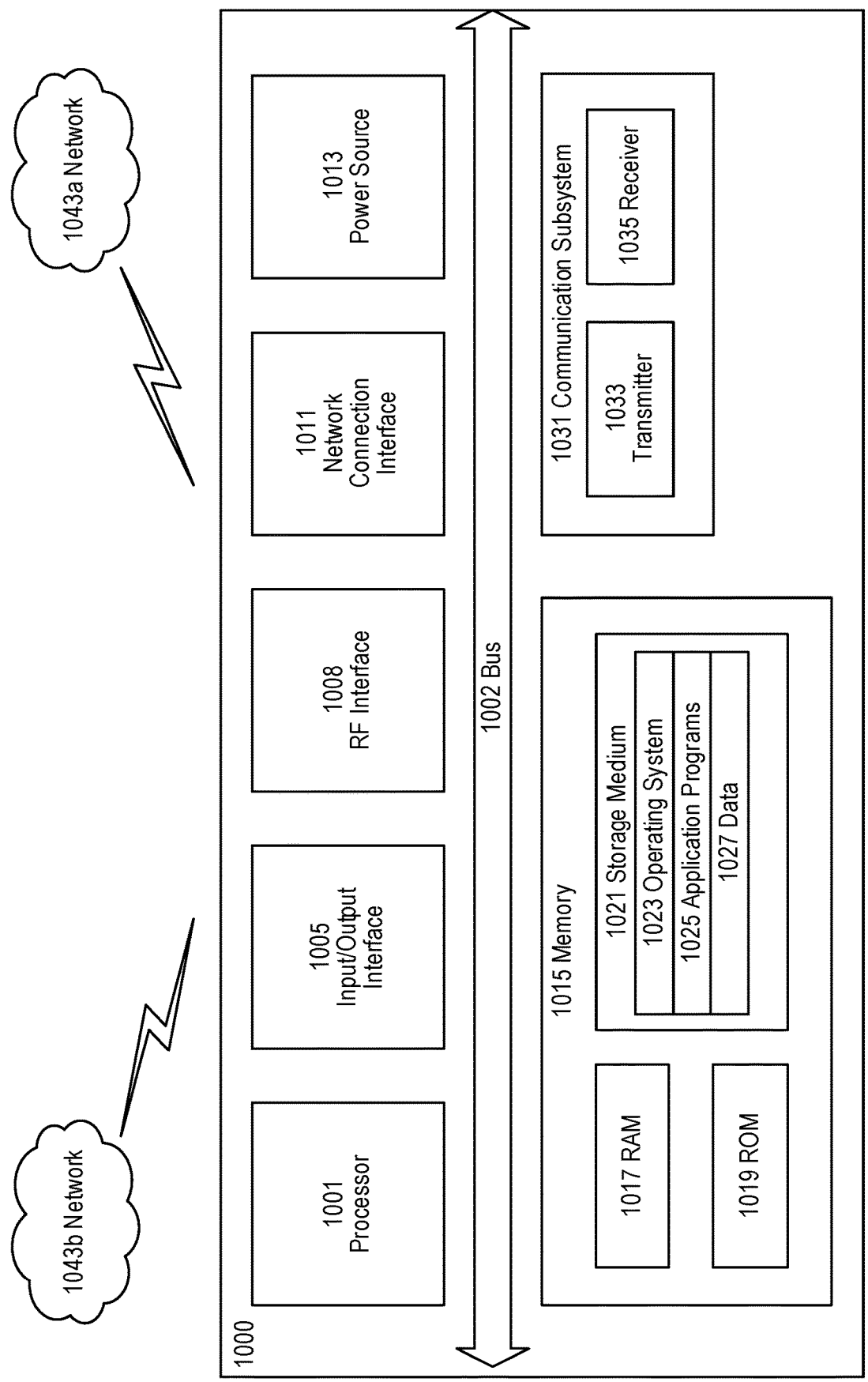
FIG. 10 illustrates an exemplary embodiment of a UE, in accordance with various aspects described herein.

FIG. 10 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1000 can be any UE identified by the $3^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 can include other similar types of information. Certain UEs can utilize all of the components shown in FIG. 10, or only a subset of the components. The level of integration between the components can vary from one UE to another UE. Further, certain UEs can contain multiple instances of a component, such as multiple processors, memories, transceivers, transmitters, receivers, etc.

In FIG. 10, processing circuitry 1001 can be configured to process computer instructions and data. Processing circuitry 1001 can be configured to implement any sequential state machine operative to execute machine instructions stored as machine-readable computer programs in the memory (e.g., stored in medium 1021), such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 can include two central processing units (CPUs). Data can be information in a form suitable for use by a computer.

In the depicted embodiment, input/output interface 1005 can be configured to provide a communication interface to an input device, output device, or input and output device. UE 1000 can be configured to use an output device via input/output interface 1005. An output device can use the same type of interface port as an input device. For example, a USB port can be used to provide input to and output from UE 1000. The output device can be a speaker, a sound card, a video card, a display, a monitor, a printer, an actuator, an emitter, a smartcard, another output device, or any combination thereof. UE 1000 can be configured to use an input device via input/output interface 1005 to allow and/or facilitate a user to capture information into UE 1000. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 10, RF interface 1009 can be configured to provide a communication interface to RF components such as a transmitter, a receiver, and an antenna. Network connection interface 1011 can be configured to provide a communication interface to network 1043a. Network 1043a can encompass wired and/or wireless networks such as a local-area network (LAN), a wide-area network (WAN), a computer network, a wireless network, a telecommunications network, another like network or any combination thereof. For example, network 1043a can comprise a Wi-Fi network. Network connection interface 1011 can be configured to include a receiver and a transmitter interface used to communicate with one or more other devices over a communication network according to one or more communication protocols, such as Ethernet, TCP/IP, SONET, ATM, or the like. Network connection interface 1011 can implement receiver and transmitter functionality appropriate to the communication network links (e.g., optical, electrical, and the like). The transmitter and receiver functions can share circuit components, software or firmware, or alternatively can be implemented separately.

RAM 1017 can be configured to interface via bus 1002 to processing circuitry 1001 to provide storage or caching of data or computer instructions during the execution of software programs such as the operating system, application programs, and device drivers. ROM 1019 can be configured to provide computer instructions or data to processing circuitry 1001. For example, ROM 1019 can be configured to store invariant low-level system code or data for basic system functions such as basic input and output (I/O), startup, or reception of keystrokes from a keyboard that are stored in a non-volatile memory. Storage medium 1021 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 can be configured to include operating system 1023, application program 1025 such as a web browser application, a widget or gadget engine or another application, and data file 1027. Storage medium 1021 can store, for use by UE 1000, any of a variety of various operating systems or combinations of operating systems.

Storage medium 1021 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 can allow and/or facilitate UE 1000 to access computer-executable instructions, application programs or the like, stored on transitory or non-transitory memory media, to off-load data, or to upload data. An article of manufacture, such as one utilizing a communication system can be tangibly embodied in storage medium 1021, which can comprise a device readable medium.

In FIG. 10, processing circuitry 1001 can be configured to communicate with network 1043b using communication subsystem 1031. Network 1043a and network 1043b can be the same network or networks or different network or networks. Communication subsystem 1031 can be configured to include one or more transceivers used to communicate with network 1043b. For example, communication subsystem 1031 can be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver can include transmitter 1033 and/or receiver 1035 to implement transmitter or receiver functionality, respectively, appropriate to the RAN links (e.g., frequency allocations and the like). Further, transmitter 1033 and receiver 1035 of each transceiver can share circuit components, software or firmware, or alternatively can be implemented separately.

In the illustrated embodiment, the communication functions of communication subsystem 1031 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 can include cellular communication, Wi-Fi communication, Bluetooth communication, and GPS communication. Network 1043b can encompass wired and/or wireless networks such as a local-area network (LAN), a wide-area network (WAN), a computer network, a wireless network, a telecommunications network, another like network or any combination thereof. For example, network 1043b can be a cellular network, a Wi-Fi network, and/or a near-field network. Power source 1013 can be configured to provide alternating current (AC) or direct current (DC) power to components of UE 1000.

The features, benefits and/or functions described herein can be implemented in one of the components of UE 1000 or partitioned across multiple components of UE 1000. Further, the features, benefits, and/or functions described herein can be implemented in any combination of hardware, software or firmware. In one example, communication subsystem 1031 can be configured to include any of the components described herein. Further, processing circuitry 1001 can be configured to communicate with any of such components over bus 1002. In another example, any of such components can be represented by program instructions stored in memory that when executed by processing circuitry 1001 perform the corresponding functions described herein. In another example, the functionality of any of such components can be partitioned between processing circuitry 1001 and communication subsystem 1031. In another example, the non-computationally intensive functions of any of such components can be implemented in software or firmware and the computationally intensive functions can be implemented in hardware.

Figure 11:
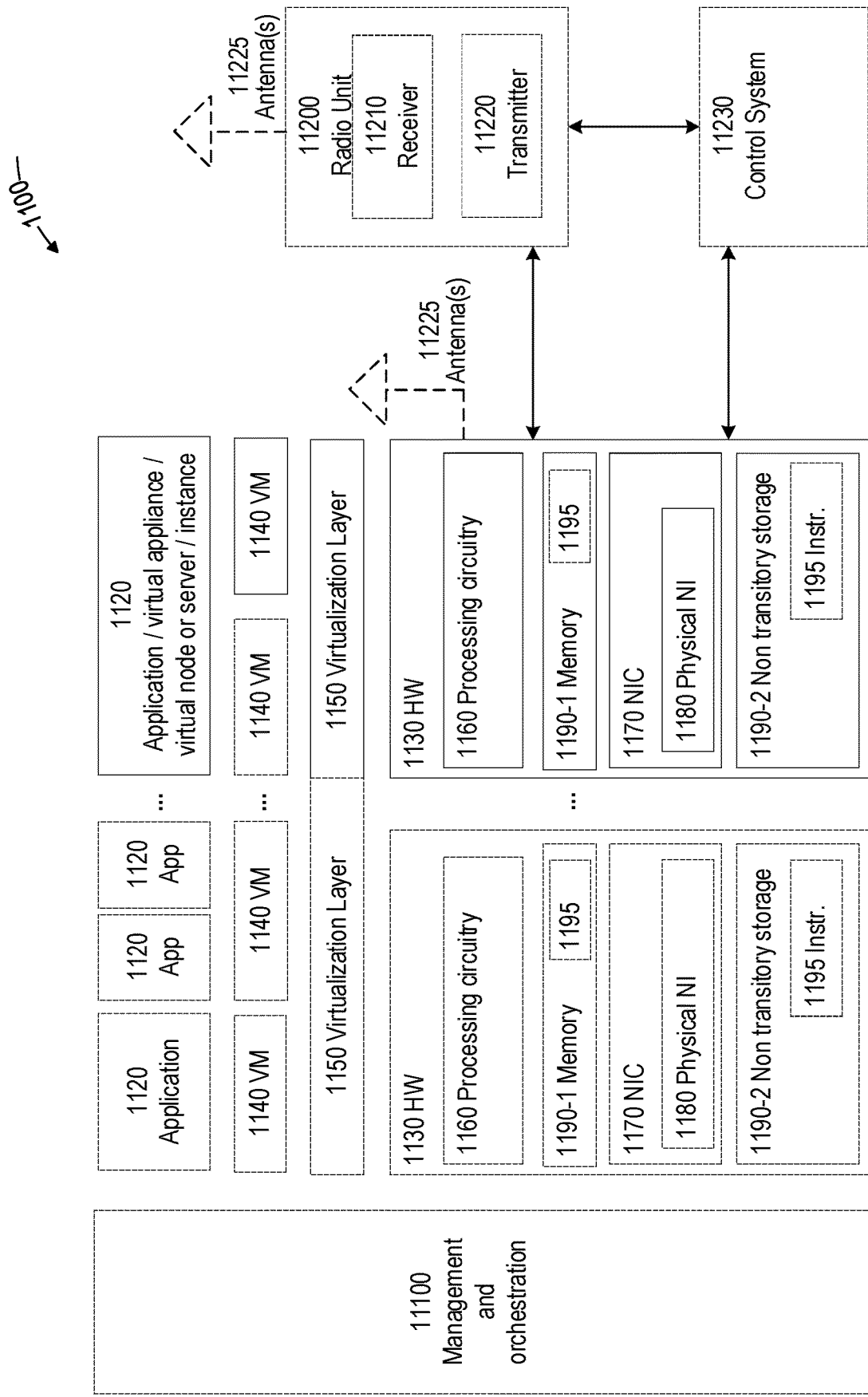
FIG. 11 is a block diagram illustrating an exemplary virtualization environment usable for implementation of various embodiments of network nodes described herein.

FIG. 11 is a schematic block diagram illustrating a virtualization environment 1100 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node can be entirely virtualized.

The functions can be implemented by one or more applications 1120 (which can alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which can be commercial off-the-shelf (COTS) processors, dedicated Application Specific Integrated Circuits (ASICs), or any other type of processing circuitry including digital or analog hardware components or special purpose processors. Each hardware device can comprise memory 1190-1 which can be non-persistent memory for temporarily storing instructions 1195 or software executed by processing circuitry 1160. Each hardware device can comprise one or more network interface controllers (NICs) 1170, also known as network interface cards, which include physical network interface 1180. Each hardware device can also include non-transitory, persistent, machine-readable storage media 1190-2 having stored therein software 1195 and/or instructions executable by processing circuitry 1160. Software 1195 can include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and can be run by a corresponding virtualization layer 1150 or hypervisor. Different embodiments of the instance of virtual appliance 1120 can be implemented on one or more of virtual machines 1140, and the implementations can be made in different ways.

During operation, processing circuitry 1160 executes software 1195 to instantiate the hypervisor or virtualization layer 1150, which can sometimes be referred to as a virtual machine monitor (VMM). Virtualization layer 1150 can present a virtual operating platform that appears like networking hardware to virtual machine 1140.

As shown in FIG. 11, hardware 1130 can be a standalone network node with generic or specific components. Hardware 1130 can comprise antenna 11225 and can implement some functions via virtualization. Alternatively, hardware 1130 can be part of a larger cluster of hardware (e.g., such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1140 can be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 can be coupled to one or more antennas 11225. Radio units 11200 can communicate directly with hardware nodes 1130 via one or more appropriate network interfaces and can be used in combination with the virtual components to provide a virtual node with radio capabilities, such as a radio access node or a base station.

In some embodiments, some signalling can be effected with the use of control system 11230 which can alternatively be used for communication between the hardware nodes 1130 and radio units 11200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Example embodiments of the techniques and apparatus described herein include, but are not limited to, the following enumerated examples:

1. A method of estimating the position of a user equipment (UE) in a network comprising a plurality of reference stations associated with a plurality of coordinate reference systems, the method comprising:
performing one or more positioning measurements in relation to a first reference system;
receiving transfer information between the first reference system and a second reference system associated with the second reference station;
associating location coordinates of one or more entities with the second reference system; and
determining an estimate of the UE's position based on the location coordinates of that one or more entities that are associated with the second reference system.

2. The method of embodiment 1, further comprising:
receiving, from a network node, a request for reference system capability of the UE; and
sending, to the network node, an indication of the UE's reference system capability.

3. The method of any of embodiments 1-2, wherein performing one or more positioning measurements in relation to a first reference system comprises:
performing carrier-phase measurements of signals transmitted by a plurality of global navigation satellite system (GNSS) satellites; and
determining a first integer-ambiguity solution for the carrier-phase measurements, the first integer-ambiguity solution associated with a first reference station that is associated with the first reference system;

4. The method of embodiment 3, further comprising
sending, to a network node, identifiers of: the first reference station, a second reference station, and the first reference system; and
receiving, from the network node, the transfer information in response to sending the identifiers.

5. The method of embodiment 3, wherein determining the estimate of the UE's position comprises:
based on the received transfer information and the first integer-ambiguity solution, determining a second integer-ambiguity solution associated with a second reference station that is associated with the second reference system; and
determine an estimate the UE's position based on the second integer-ambiguity solution.

6. The method of any of embodiments 1-5, further comprising sending, to a network node, the estimate of the UE's position in association with the second reference system.

7. The method of any of embodiments 1-6, wherein the transfer information is related to one or more pairs of GNSS satellites.

8. A method, in a network node, for assisting the positioning of a user equipment (UE) in a network comprising a plurality of reference stations associated with a plurality of coordinate reference systems, the method comprising:
receiving, from the UE, identifiers of: a first reference station, a second reference station, and a first reference system associated with the first reference station; and
sending, to the UE, transfer information between the first reference system and a second reference system associated with a second reference station.

9. The method of embodiment 8, further comprising:
sending, to the UE, a request for reference system capability of the UE; and
receiving, from the UE, an indication of the UE's reference system capability.

10. The method of any of embodiments 8-9, further comprising receiving, from the UE, an estimate of the UE's position in association with the second reference system.

11. The method of any of embodiments 8-10, wherein the transfer information is related to one or more pairs of global navigation satellite system (GNSS) satellites.

12. A User Equipment (UE) operable for position estimation in a network comprising a plurality of reference stations associated with a plurality of coordinate reference systems, the UE comprising:

one or more antennas configured to send and receive wireless network signals and positioning signals;

radio circuitry operably coupled to the one or more antennas; and processing circuitry operably coupled to the radio front-end circuitry and configurable to perform operations corresponding to any of the methods of embodiments 1-8.

13. The UE of embodiment 12, further comprising:

an input interface connected to the processing circuitry and configured to allow input of information to be processed by the processing circuitry;

an output interface connected to the processing circuitry and configured to output information that has been processed by the processing circuitry; and a battery connected to the processing circuitry and configured to supply power to the UE.

14. A network node operable for assisting the positioning of a user equipment (UE) in a network comprising a plurality of reference stations associated with a plurality of coordinate reference systems, the network node comprising:

communication circuitry operable to exchange information with the UE; and processing circuitry operably coupled to the communication circuitry and configurable to perform operations corresponding to any of the methods of embodiments 9-12.

The invention claimed is:

1. A method of estimating the position of a user equipment (UE) in association with a plurality of reference stations, the method comprising:

receiving, from a network node, a request for reference system capability of the UE;

sending, to the network node, an indication of the UE's reference system capability;

performing one or more positioning measurements for the UE;

receiving transfer information between a first reference system and a second reference system; and determining an estimate of the UE's position based on:
the positioning measurements for the UE,
the transfer information, and
location coordinates of a plurality of entities, wherein the location coordinates of at least one entity is associated with the first reference system and the location coordinates of at least one other entity is associated with the second reference system.

2. The method of claim 1, wherein the plurality of entities includes any of the following: physical reference station, virtual reference station, serving network node for the UE, neighbor network node, network transmission or reception point, global navigation satellite system (GNSS) satellite, and another UE.

3. The method of claim 1, wherein:

performing the one or more positioning measurements for the UE comprises performing first carrier-phase measurements of signals transmitted by a plurality of global navigation satellite system (GNSS) satellites; and determining the estimate of the UE's position comprises:
receiving second carrier-phase measurements of the signals transmitted by the GNSS satellites, wherein the second carrier-phase measurements are made by a first reference station associated with the first reference system; and determining a first integer-ambiguity solution for the first carrier-phase measurements based on the second carrier-phase measurements and the location coordinates of the first reference station.

4. The method of claim 3, wherein determining the estimate of the UE's position further comprises:

receiving third carrier-phase measurements of the signals transmitted by the GNSS satellites, wherein the third carrier-phase measurements are made by a second reference station associated with the second reference system; and determining a second integer-ambiguity solution for the first carrier-phase measurements based on the following: the first integer-ambiguity solution, the third carrier-phase measurements, and location coordinates of the second reference station.

5. The method of claim 4, wherein determining the estimate of the UE's position further comprises determining the estimate of the UE's position based on the second integer-ambiguity solution and the positioning measurements.

6. The method of claim 4, wherein determining the second integer-ambiguity solution comprises transforming the location coordinates of the second reference station to the first reference system based on the transfer information;

the second integer-ambiguity solution is determined based on the transformed location coordinates of the second reference station; and the UE's position is determined in relation to the first reference system.

7. The method of claim 3, wherein:

determining the first integer-ambiguity solution comprises transforming the location coordinates of the first reference station to the second reference system based on the transfer information;

the first integer-ambiguity solution is determined based on the transformed location coordinates of the first reference station; and the UE's position is determined in relation to the second reference system.

8. The method of claim 3, wherein:

the method further comprising sending, to a wireless network, identifiers of the following: the first reference station, a second reference station, and the first reference system; and the transfer information is received in response to sending the identifiers.

9. The method of claim 1, further comprising obtaining an indication of a preferred reference system, wherein:

the preferred reference system is the first reference system or the second reference system;

obtaining the indication of the preferred reference system comprises one of the following:
receiving a message from a wireless network,
receiving an input to a user interface of the UE, or
reading from a memory within the UE; and the estimate of the UE's position is determined in relation to the preferred reference system.

10. The method of claim 1, further comprising receiving, from a wireless network, one or more of the following:

coordinates of a first reference station together with an indication of the first reference system; and coordinates of a second reference station together with an indication of the second reference system.

11. The method of claim 1, further comprising sending, to a network node, the estimate of the UE's position in relation to the second reference system.

12. The method of claim 1, wherein the transfer information is related to one or more pairs of GNSS satellites.

13. A user equipment (UE) operable for position estimation in association with a plurality of reference stations, the UE comprising:
- one or more antennas configured to send and receive wireless network signals and to receive global navigation satellite system (GNSS) signals;
- radio interface circuitry operably coupled to the one or more antennas; and
- processing circuitry operably coupled to the radio interface circuitry, whereby the processing circuitry and the radio interface circuitry are configured to perform operations corresponding to the method of claim 1.

14. A non-transitory, computer-readable medium storing computer-executable instructions that, when executed by processing circuitry of a user equipment (UE), configure the UE to perform operations corresponding to the method of claim 1.

15. A method, for a network node, to assist positioning of a user equipment (UE) in association with a plurality of reference stations, the method comprising:
- sending, to the UE, a request for reference system capability of the UE;
- receiving, from the UE, an indication of the UE's reference system capability;
- receiving, from the UE, identifiers of the following: a first reference station, a first reference system associated with the first reference station, and a second reference station; and
- sending, to the UE, transfer information between the first reference system and a second reference system associated with the second reference station.

16. The method of claim 15, further comprising receiving, from the UE, an estimate of the UE's position in association with the first reference system or the second reference system.

17. The method of claim 15, further comprising sending, to the UE, an indication of a preferred reference system, wherein the preferred reference system is the first reference system or the second reference system.

18. The method of claim 15, further comprising sending, to the UE, one or more of the following:
- coordinates of the first reference station together with an indication of the first reference system; and
- coordinates of the second reference station together with an indication of the second reference system.

19. The method of claim 15, wherein the transfer information is related to one or more pairs of global navigation satellite system (GNSS) satellites.

20. A network node operable for assisting the positioning of a user equipment (UE) in association with a plurality of reference stations, the network node comprising:
- radio interface circuitry operable to communicate with the UE; and
- processing circuitry operably coupled to the radio interface circuitry, whereby the processing circuitry and the radio interface circuitry are configured to perform operations corresponding to the method of claim 15.

21. A non-transitory, computer-readable medium storing computer-executable instructions that, when executed by processing circuitry of a network node, configure the network node to perform operations corresponding to the method of claim 15.

* * * * *